United States Patent [19]

Adda et al.

[11] Patent Number: 5,073,267
[45] Date of Patent: Dec. 17, 1991

[54] PROCESS FOR THE EXTRACTION OF VOLATILE COMPOUNDS WITH SUPERCRITICAL CARBON DIOXIDE, AND COMPOUNDS OBTAINED

[75] Inventors: Jacques Adda, Versailles; Jean-Luc Lorne, Clichy, both of France

[73] Assignee: Institut National de la Recherche Agronomique, Paris, France

[21] Appl. No.: 458,736

[22] PCT Filed: Apr. 6, 1989

[86] PCT No.: PCT/FR89/00158
§ 371 Date: Jan. 12, 1990
§ 102(e) Date: Jan. 12, 1990

[87] PCT Pub. No.: WO89/09639
PCT Pub. Date: Oct. 19, 1989

[30] Foreign Application Priority Data
Apr. 11, 1988 [FR] France .............................. 88 04765

[51] Int. Cl.$^5$ ............................................. B01D 11/00
[52] U.S. Cl. ...................................... 210/634; 203/16
[58] Field of Search .................. 210/511, 634; 203/43, 203/16, 19

[56] References Cited

U.S. PATENT DOCUMENTS 4,770,780  9/1988  Moses ................................ 210/634
4,867,997  9/1989  Wiesenberger et al. ............ 426/387

Primary Examiner—Frank Sever
Attorney, Agent, or Firm—Berman & Aisenberg

[57] ABSTRACT

In this process a percolation of supercritical gas through the starting material is conducted, the carbon dioxide loading with extractable compounds, then, when the percolation pressure reaches a predetermined value, the percolation medium is let down, feeding the latter into a separation zone in which the volatile compounds are trapped in the solid carbon dioxide formed, these compounds being recovered in aqueous solution after sublimation of $CO_2$. According to the invention, the extraction is conducted, in the separation zone, in the presence of a trapping medium suitable for retaining the volatile compounds, advantageously a medium which has very low solubility in liquid or supercritical $CO_2$ and is capable of dissolving the volatile compounds (glycerol or edible oil) or of complexing these (cyclodextrins). The starting material chosen has a lipid content which is not excessively high (especially fruits and derived products). The trapping medium having retained the volatile compounds and the latter, after separation from the said medium, are used as aroma substances.

14 Claims, 9 Drawing Sheets

PROCESS FOR THE EXTRACTION OF VOLATILE COMPOUNDS WITH SUPERCRITICAL CARBON DIOXIDE, AND COMPOUNDS OBTAINED

The present invention relates to an improved process for the extraction of volatile compounds with carbon dioxide and to the volatile compounds obtained by this process.

Conventionally, the two most important physicochemical methods for the extraction of substances are distillation and the use of solvents.

It is known that the drawback of distillation is that the mixtures of substances to be separated must be heated the more strongly the lower the vapour tension of the substances to be separated. Distillation reaches its limits when the substances are no longer heat-stable. The use of vacuum certainly widens the field of application of this separation process, but only in a supplementary boiling range of about 100° to 150° C.

Solvent extraction can be used only in a limiting manner, since the choice of the appropriate solvent or solvents frequently presents difficulties, or there is no suitable solvent at all. This method reaches its limits when the solubility properties of the constituents of the mixture to be separated are so close that it is no longer possible to obtain an efficient separating effect. The presence of residual solvents in an amount which is frequently not negligible and indeed significant in the extracts and consequently the perfumed or foodstuff end products has caused consumers to realize the danger of such extracts, which has led to more and more stringent national and international regulations on the use of certain solvents.

All of these problems justify the use of supercritical fluids, which offer most of the advantages sought.

It is known that a gas is in the supercritical state when it is at a temperature and under a pressure greater than those of its critical point (31° C. and $73 \times 10^5$ Pa for $CO_2$); this state, fluid, is neither the liquid state nor the gaseous state; its solvent power depends largely on the temperature and the pressure at which it happens to be.

Extraction by supercritical $CO_2$ is a well-established technique today which can be successfully employed for the recovery of volatile products responsible for aroma. Thus, the extraction is effected by percolating supercritical gas through the starting material, put in an appropriate form, after which the separation of the compounds extracted is effected, preferably, by simply lowering the pressure of the percolation mixture to a pressure below the critical pressure of $CO_2$, preferably between 45 and $57 \times 10^5$ Pa. In addition it is possible to lower the temperature to a value below the critical temperature of $CO_2$; the temperature in the separators is, for example, between $+10°$ C. and $+25°$ C. at most, whereas the pressure generally does not exceed $64 \times 10^5$ Pa.

An extraction process of this type is rapid. Unfortunately, loss of the most volatile compounds or the most polar compounds occur, these compounds being either lost during let-down, when the apparatus is brought back to atmospheric pressure, or lost during the evaporation of the solid carbon dioxide which is formed during let-down, or are not recovered in the separator because the solubility in liquid or supercritical $CO_2$ is too high.

Various techniques have been proposed to date to improve the recovery of these compounds: modification of the size and the geometry of the separator or bubbling of $CO_2$ in a solvent, which $CO_2$ is liberated during the evaporation of the solid carbon dioxide. However, these techniques do not bring sufficient improvement.

The present invention provides a solution to this problem. To this end, it is proposed, according to the invention, to add an appropriate trapping medium in the separator of a supercritical carbon dioxide extractor.

The subject of the present invention is, thus, a process for the extraction of volatile compounds from a starting material with supercritical carbon dioxide, according to which a percolation of supercritical gas through the said starting material is conducted, the carbon dioxide loading with extractable compounds, then, when the percolation pressure reaches a predetermined value, the percolation medium is let down, feeding the latter into a separation zone in which the volatile compounds are trapped in the solid carbon dioxide formed, the volatile compounds being recovered in aqueous solution after sublimation of $CO_2$, characterized in that the extraction is conducted, in the separation zone, in the presence of a trapping medium which is suitable for retaining the said volatile compounds.

In particular, a trapping medium is chosen which has very low solubility in liquid or supercritical $CO_2$ and is capable of dissolving or complexing the volatile compounds of the starting material.

Moreover, a trapping medium which can be used directly in the agro-foodstuffs field is advantageously chosen. Consequently the trapping medium/volatile compounds combination can be used directly, as aroma substances, especially in the agro-foodstuffs industry. It is also possible to isolate the volatile compounds by known techniques, for example by solvent extraction or by distillation.

Examples of a trapping medium according to the invention which may be mentioned are glycerol, edible oils, preferably of neutral taste, such as peanut oil, sunflower oil, rapeseed oil, corn oil and the like, and the cyclodextrins, such as $\beta$-cyclodextrin. These media have shown themselves capable, each with its specificity, of improving the recovery of volatile compounds.

Glycerol, a non-toxic substance, is capable of dissolving numerous organic molecules, including those responsible for aromas. In addition, the invention benefits from the particular property of glycerol of being supercooling and, consequently, of remaining liquid even at the very low extraction temperatures involved with supercritical $CO_2$.

The $\beta$-cyclodextrins, brought into solution, precipitate in the form of non-volatile complexes with numerous molecules, including those of aroma substances, and this property is turned to advantage here to prepare stable powders (with regard to evaporation and oxidation), which can then be used in foodstuff preparations.

The starting materials which may be mentioned are materials containing volatile products and having a lipid content which is not excessively high, as is the case, in particular, with fruits and beverages.

The invention is most advantageously applicable to fruits and derived products, such as fruit juices and fermented beverages, and also to non-fatty vegetable materials containing essential oils, that is to say to the exclusion of oily products.

Amongst the fruits, the process of the invention is advantageously applicable to small fruits, such as strawberries, raspberries, cherries and blackcurrants, tropical fruits, such as mango, passion fruit, papaya, kiwi fruit, and the like.

The invention may also be used for the extraction of volatile products contained in flowers, such as lilacs, geraniums, lavender and roses, and also in aromatic plants, such as tarragon, chervil, dill, etc.

According to another characteristic of the process according to the present invention, the trapping medium is introduced in the separation zone in a proportion determined relative to the treated starting material. This zone must be adapted to the nature of the treated starting material and to the trapping medium chosen. Thus, in the case of edible oils or of glycerol, the range to be used may vary from 1 to 10% by weight relative to the starting material, and in the case of cyclodextrins a range of 0.05 to 0.5% by weight relative to the starting material may be recommended. In other respects, the use of larger proportions of trapping medium remains technically possible, but it leads to less concentrated products, which, as a general rule, is less desirable.

The present invention also relates to the trapping medium having retained the volatile compounds, as is obtained by the process which has just been defined, to the volatile compounds separated from this medium and to the application of the trapping medium/volatile compounds combination, and of the volatile compounds separated, as aroma substances, especially in the agro-foodstuffs industry.

The present invention will now be described in more detail with respect to the equipment which may be used and the techniques for extraction and separation of the volatile compounds. Examples and comparative examples are also presented to better illustrate the results and advantages which can be obtained by the present invention. In this part of the description, reference is made to the appended drawing, in which.

FIGS. 5(broken up FIG. 5a, 5b, 5c, 5d, 5e) and 6 to 10 show various diagrams or curves obtained in the experiments carried out.

EXTRACTION APPARATUS AND TECHNIQUES

Figure 1:
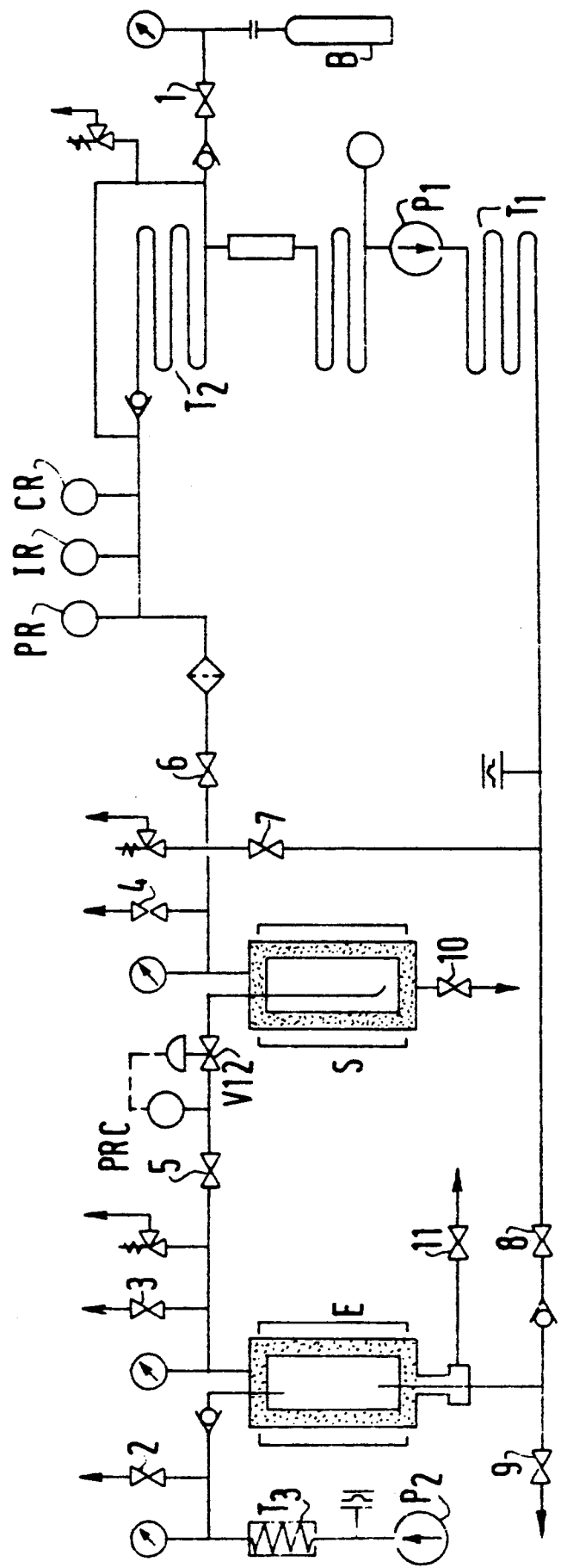
FIG. 1 is a schematic representation of an extraction apparatus which can be used for carrying out the process according to the present invention.

A conventional extraction apparatus of the commercially available type is used; the diagram of this apparatus is shown in FIG. 1. The legend for this figure is as follows:

B : $CO_2$ bottle
E : extractor
S : separator
$P_1$ : $CO_2$ pump
$P_2$ : liquid pump
$T_1$ : heater
$T_2$ : condenser
$T_3$ : heater
$V_{12}$: discharge valve
$V_{11}$: liquid outlet valve
PR : pressure measurement
TR : temperature measurement
FR : flow measurement
PRC: measurement of the pressure controlling the discharge valve.

The other valves are numbered 1 to 11.

An active charcoal filter is placed at the inlet to the extraction apparatus so as to trap the impurities contained in the $CO_2$.

The starting material is placed in the extractor E, which is kept at the desired temperature throughout the extraction by means of water circulation in a jacket.

The entire installation is filled with $CO_2$ in an amount sufficient for the pressure in the extractor to attain the desired starting pressure, by means of the pump $P_1$.

The carbon dioxide used is stored in the liquid state in the bottle B. The $CO_2$ present in the separator S must be at a liquid/vapour equilibrium temperature and pressure.

The $CO_2$ thus arrives in liquid form at the pump $P_1$; it is then brought to the desired temperature by the heat exchanger $T_1$. The $CO_2$ then enters the extractor E; it passes through the material, loading with extractable compounds. When the pressure in the extractor exceeds the set pressure, the discharge valve $V_{12}$ opens, the $CO_2$ is let down on this side from its critical value (73 bars) and it arrives in the separator S. While the extract is dissolving in the liquid $CO_2$, the excess gaseous $CO_2$ in the separator escapes and is condensed by means of the heat exchanger $T_2$ before being recompressed by the pump $P_1$. By means of continuous recycling of $CO_2$, the apparatus can be isolated from the bottle B of liquid $CO_2$ and operates without supply of $CO_2$ during the extraction.

At the end of the extraction, the separator is cooled to close to $-10°$ C. The valve 4 is opened, abruptly liberating all of the gaseous $CO_2$ from the separator.

Letting down a true gas under high pressure is always accompanied by cooling. For carbon dioxide, for one mole, a fall in temperature of the order of 280° C. approximately is obtained. $CO_2$ solidifies at about $-80°$ C. and on letting down it rapidly forms a block of solid carbon dioxide, imprisoning the extract.

The separator S must be half-filled with liquid $CO_2$. If it becomes full, it is liquid $CO_2$ which issues from the separator. It carries with it some of the extract into the pipes, which results in a loss of extract. On the other hand, if the separator no longer contains liquid $CO_2$ its temperature rises since there is no further evaporation expending heat, and the volatile compounds risk leaving the separator again, liquid $CO_2$ no longer being there to act as solvent-trapping agent.

Figure 2:
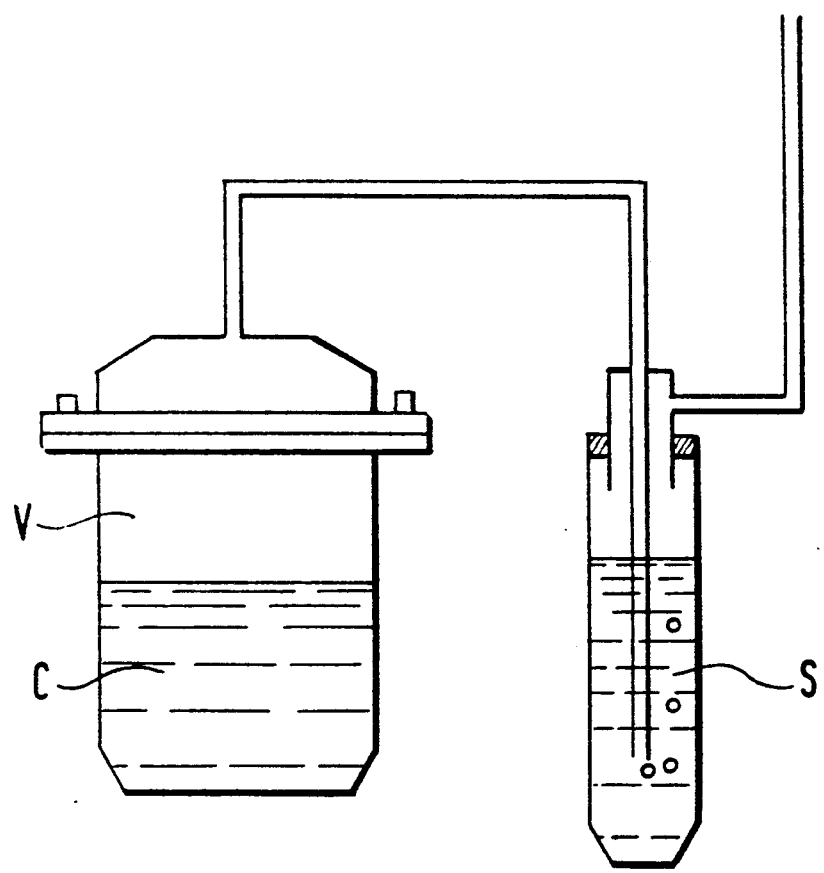
FIG. 2 shows the installation used for bubbling solid carbon dioxide during sublimation.

The block C of solid carbon dioxide, obtained after the extraction, starts to sublime at atmospheric pressure. In order to slow down the sublimation as far as possible and thus to prevent the $CO_2$ vapours (V) entraining volatile compounds, the block of solid carbon dioxide is placed in a reactor (see FIG. 2) at $-20°$ C. The $CO_2$ liberated then bubbles into a solvent S, in order to recover the most volatile compounds which, despite everything, would be entrained by the gaseous $CO_2$. It is found, after analysis, that the solvent used for bubbling generally contains low amounts of volatile compounds.

After sublimation of the $CO_2$, aqueous solutions with a volume generally of between 10 and 20 ml are recovered, to which water (100 ml), with which the walls of the separator have been rinsed, is added. An aqueous solution with a final volume of between 110 and 120 ml is thus obtained. The pH of the extract is brought to 9.5 by adding 1.5 ml of 20% (1.9 M) $Na_2CO_3$, to ensure that only the neutral fraction is extracted.

The aromatic compounds obtained in aqueous media by the method of extraction with supercritical $CO_2$ must be extracted with solvent for the subsequent analyses. Here the aqueous solutions are extracted a first time for 1 hour with 50 ml of methylene chloride which has previously also been used to rinse the walls of the separator, then twice with 20 ml of methylene chloride for half an hour. The extractions are carried out at 0° C. in a bath of melting ice. Magnetic stirring and a separating funnel are used for this purpose.

The organic phase recovered is dried with the aid of sodium sulphate.

EXTRACTIONS IN ACCORDANCE WITH THE PROCESS OF THE INVENTION

Mode of operation no. 1

Extractions conducted in the presence of glycerol in the separator

Glycerol, likewise recovered after sublimation of solid carbon dioxide, is diluted by a factor of 2 with ultrapure Millipore water and the pH of the extract is brought to 9.5 by adding about 10 ml of 20% $Na_2CO_3$. The addition of water to glycerol enables the viscosity of the latter to be lowered and facilitates the extraction of the aromatic compounds. The extract is then reextracted with 100 ml of trichlorofluoromethane (Forane 11) for one hour and twice for half an hour with 50 ml of Forane 11 and the extract is then also extracted with methylene chloride according to an identical process.

Mode of operation no. 2

Extractions conducted in the presence of peanut oil in the separator

The oil chosen for this experiment is peanut oil, which is characterized by a high content of oleic acid and a moderate content of polyunsaturated fatty acids. The oil has previously been deodorized by distillation under a vacuum of $1.33 \times 10^{-3}$ Pa for 24 hours.

Starting from extractions conducted in the presence of oil in the separator, an extract is obtained, after sublimation of the solid carbon dioxide, which is made up of two phases: one aqueous and the other lipid. The extract, to which 100 ml of water and 50 ml of the solvent used for rinsing the separator are added, is then distilled in vacuo. In an initial period, the extract is subjected to a primary vacuum of 1.33 Pa for 8 hours; it is then kept under a secondary vacuum of $1.33 \times 10^{-3}$ Pa for 5 hours.

Figure 3:
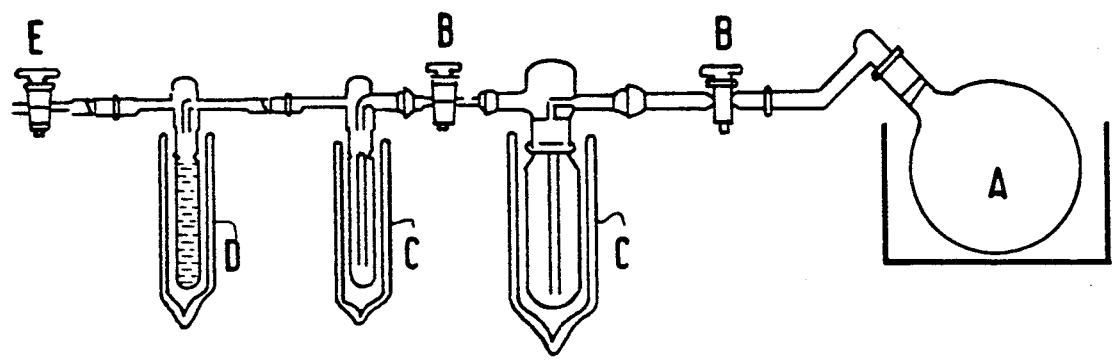
FIGS. 3 and 4 show the installations used for the distillations under primary vacuum and under secondary vacuum respectively, in the case of extractions conducted in the presence of oil in the separator.

The installation shown schematically in FIG. 3 was used for the distillation at 1.33 Pa.

Legend for FIG. 3
A : flask containing the sample
B : taps
C : straight trap placed in liquid nitrogen
D : spiral trap placed in liquid nitrogen
E : connection to the pump and to the vacuum gauge.

The 6-liter flask A containing the extract dips into a water bath at 35° C. The volatile products and the water are condensed in the trap C cooled by liquid nitrogen. The spiral traps D constitute a safety measure to prevent losses of the more volatile substances. The tap E, kept closed during the course of the operation, is opened only to reestablish the vacuum.

The distillates recovered in the different traps are combined before solvent extraction. The residual oil at the end of the distillation in the flask A again contains some of the compounds because they are less volatile but also because of the high retention power of the oil. A vacuum of 1.33 Pa is not sufficient to extract these compounds; a vacuum of $1.33 \times 10^{-3}$ Pa was then used and to this end the installation of FIG. 4 was employed.

Figure 4:
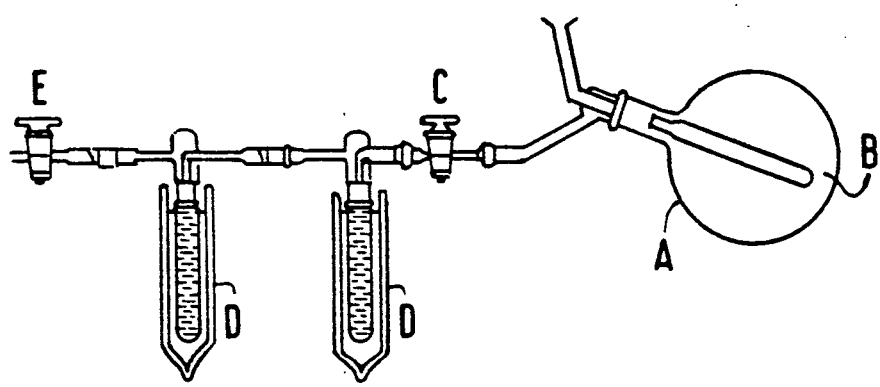
Figure 5A:
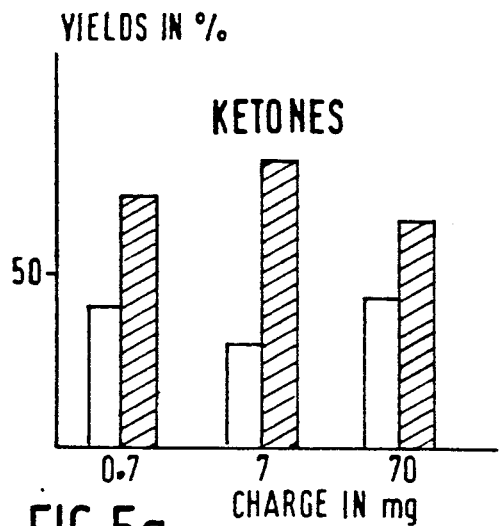
Figure 5B:
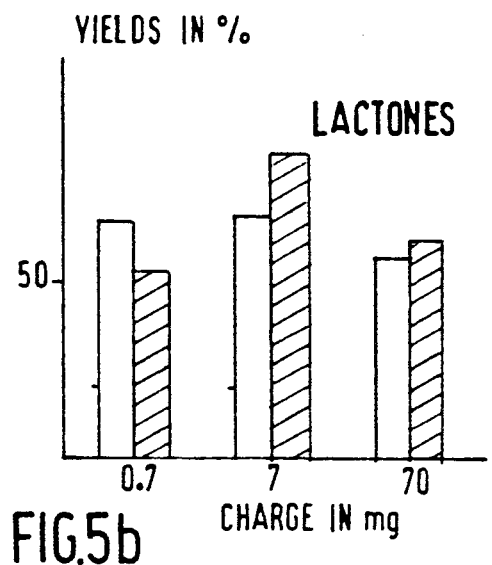
Figure 5C:
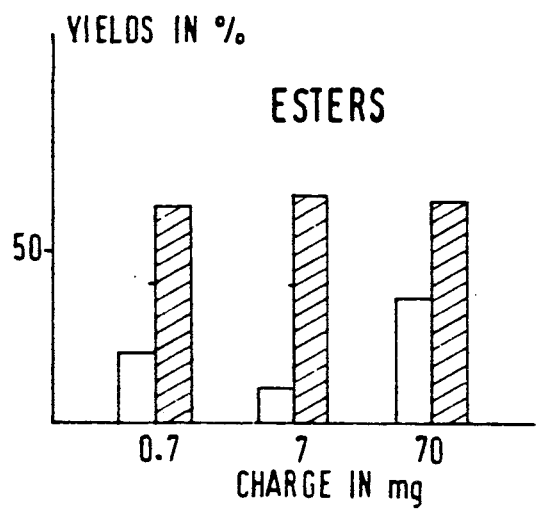
Figure 5D:
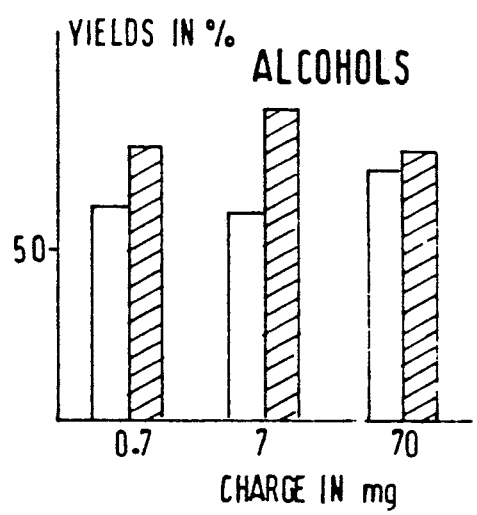
Figure 5E:
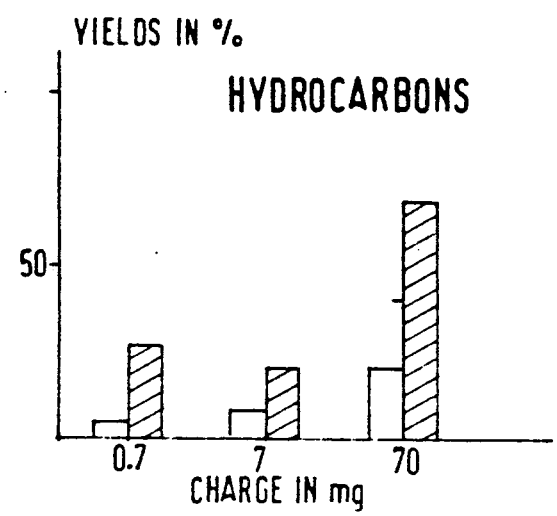

Legend for FIG. 4:
A : flask containing the sample
B : finger filled with liquid nitrogen
C : tap
D : spiral traps placed in liquid nitrogen
E : connection to the pump and to the vacuum gauge.

The 6-liter flask A (the same as for the first distillation) dips into a water bath at 40° C. The volatile compounds are retained in the spiral traps D. The installation has a finger B, filled with liquid nitrogen. The least volatile substances are trapped on the walls of the finger under the effect of the high vacuum and of the proximity of the cold surface, which makes this method of extraction resemble a molecular distillation.

Once this is complete, the substances to be trapped are recovered by rinsing the finger with the same solvent as is used for extraction of the fractions retained in the traps. They are added before concentration to the solvent used for extraction of the other fractions.

All of the fractions obtained in the two successive distillations under vacuum are combined and reextracted for 1 hour with 50 ml of Forane 11 and twice for half an hour with 20 ml. The extract is then also extracted with methylene chloride under the same conditions.

Mode of operation no. 3

Extractions conducted in the presence of $\beta$-cyclodextrins in the separator

The $\beta$-cyclodextrins (cyclic polymers with 7 glucose units) which are used are characterized by their infrared spectrum comparable to that obtained by WIEDENHOF et al., 1969, "Properties of cyclodextrins part III. Cyclodextrin-epichlorhydrin resins : Preparation and analysis. Die Stärke, 21,119."

The extractions in the presence of cyclodextrins were conducted in parallel, in the conventional manner and in the separator of the extractor E of the equipment according to the invention.

(a) Extraction conducted in the conventional manner:

10 g of $\beta$-cyclodextrins are dissolved in 200 ml of an ethanol/water solution ($\frac{1}{2}$) (V/V) at 55° C. 10 ml of starting material (made up of a model solution which will be described below) are added to the solution of $\beta$-cyclodextrins at 55° C. The mixture is cooled slowly (about 4 hours) until it reaches an ambient temperature of 22°-24° C., while maintaining magnetic stirring throughout. The mixture is then placed at 4° C. for 16 hours. The complexes formed are recovered after centrifuging for 10 minutes at 16,300 g and filtering the supernatant liquors through a glass frit of porosity 4.

(b) Extraction conducted at high pressure in the separator:

10 g of $\beta$-cyclodextrins are dissolved in 200 ml of an ethanol/water solution ($\frac{1}{2}$) (V/V) at 55° C. The solution is placed in the separator before extraction.

At the end of the extraction, the separator containing the extract is left under pressure overnight at 4° C. and is then cooled to −10° C. and let down suddenly. The solid carbon dioxide obtained is sublimed and the extract obtained is centrifuged (10 minutes at 16,300 g) and filtered. A precipitate of $\ominus$-cyclodextrins and a supernatant liquor are obtained, the two fractions being highly aromatic.

The precipitate (made up of complexes) is resuspended in 100 ml of ultra pure water and extracted twice for 1 hour with 50 ml of methylene chloride and twice for half an hour with 20 ml of methylene chloride, with vigorous magnetic stirring.

Because of its high alcohol content (39° C.) the supernatant liquor was diluted with ultra pure water to bring its alcohol concentration to 8° C. in order to prevent the formation of a ternary mixture with the solvent. It is extracted for 1 hour with 100 ml of methylene chloride and twice for half an hour with 50 ml of methylene chloride.

COMPARATIVE TECHNIQUE

Liquid-Liquid Extraction

The comparison method of extraction chosen is liquid-liquid extraction. The solvent is recycled after having passed through the starting material, which limits the amount of solvent used. The material (model raspberry solution described below) is extracted for 4 hours with 200 ml of methylene chloride or 200 ml of Forane 11. These operations are carried out in a room air-conditioned at 15° C.

II—STARTING MATERIAL

Material No. 1

Model raspberry solution

A solution was prepared starting from compounds identified in raspberry juice, these compounds being listed in Table 1 below:

TABLE 1

| Composition of the model raspberry solution | |
|---|---|
| Compound | Quantities in mg |
| Isoamyl acetate | 39.0 |
| α-Pinene | 34.4 |
| Oct-1-en-3-ol | 32.0 |
| Heptanol | 24.5 |
| Hexyl acetate | 35.9 |
| γ-Hexalactone | 40.8 |
| Linalol | 33.4 |
| 2-Phenylethanol | 29.6 |
| Geraniol | 35.2 |
| γ-Octalactone | 38.3 |
| Damascenone | 38.3 |
| Menthyl acetate | 38.3 |
| α-Ionone | 27.8 |
| Frambinone | 64.3 |

Amongst these compounds, 1p-hydroxyphenyl-3-butanone (or frambionone) has an odour and a flavour characteristic of raspberry.

Material No. 2

Model solution of highly volatile compounds (SHV)

This solution comprises 13 compounds, amongst which are those which have the lowest boiling points and which participate in the raspberry aroma. The solution conceived comprises a significant number of terpenes and also butyl acetate, the most volatile ester found in raspberry juice. The solution also contains polar compounds, such as alcohols and lactones, amongst the most volatile (Table 2).

TABLE 2

| Model solution of volatile compounds (SHV) | |
|---|---|
| Compounds | Quantity in mg |
| 2-Hexanone | 33.9 |
| Butyl acetate | 47.5 |
| 4-Methylpentanol | 31.9 |
| cis-Hex-3-en-1-ol | 32.9 |
| Hexanol | 35.7 |
| 2-Heptanone | 33.6 |
| γ-Butyrolactone | 52.9 |
| α-Pinene | 35.3 |
| Camphene | 45.6 |
| Myrcene | 43.7 |
| α-Phellandrene | 44.4 |
| Hexyl acetate | 47.5 |
| γ-Terpinene | 41.1 |

Solutions no. 1 and no. 2 were first diluted in 20 ml of distilled ethanol. For each extraction with supercritical $CO_2$, 500 $\mu$l of each of these preliminary solutions are diluted in 1 liter of ultra pure water. The concentrations in each of the solutions approach those of a true raspberry juice.

Material No. 3

Raspberry juice

Raspberries of the variety "Rose de Côte d'Or" (*Rubus Idaeus*), considered to be one of the most aromatic, were used.

The raspberries, partially thawed and kept at a temperature below 4° C., are crushed until a homogeneous puree is obtained. The juice is obtained by centrifuging the puree at 16,300 g for 20 minutes. About 640 ml of juice are obtained per 1 kg of raspberries. Before the extraction with supercritical $CO_2$, an anti-foaming agent, polypropylene glycol, is added to the raspberry juice in a concentration of 0.1/1,000.

The examples which follow illustrate the invention.

EXAMPLE 1

Mode of Operation No. 2 and Material No. 2 the results obtained are given in Table 3.

TABLE 3

Extraction of the model solution (SHV) with supercritical $CO_2$ (P = 150 bar and T = 36° C.) in the presence or absence of edible oil in the separator.

| Compounds | Quantity in the solution in mg | Control: without oil | | Extractions with 200 ml of oil | |
|---|---|---|---|---|---|
| | | X | VC | X | VC |
| 2-Hexanone | 0.8 | 40 | 96 | 75 | 11 |
| Butyl acetate | 0.9 | 15 | 25 | 73 | 12 |
| 4-methylpentanol | 0.8 | 56 | 10 | 68 | 9 |
| cis-Hex-3-en-1-ol | 0.8 | 71 | 20 | 77 | 8 |
| Hexanol | 0.8 | 64 | 20 | 76 | 7 |
| 2-Heptanone | 0.8 | 42 | 90 | 78 | 7 |
| γ-Butyrolactone | 1.0 | 67 | 0 | 44 | 21 |
| α-Pinene | 0.8 | 3.5 | 83 | 29 | 36 |
| Camphene | 0.8 | 3 | 150 | 32 | 40 |
| Myrcene | 0.8 | 3 | 147 | 34 | 38 |
| α-Phellandrene | 0.8 | 1 | 173 | 42 | 28 |
| Hexyl acetate | 0.9 | 28 | 20 | 78 | 6 |
| γ-Terpinene | 0.8 | 4 | 132 | 41 | 35 |

X: mean of the yields (in percent)
VC: variation coefficient (in percent)

It is seen that the contents of 2-hexanone and 2-heptanone are doubled if oil is present. Likewise, the esters see their yields more than doubled; butyl acetate, for example, has a yield which is quintupled.

With regard to the alcohols and to the lactone, an improvement in their rates of extraction is seen in the extracts obtained in the presence of oil, although this improvement may be moderate and the least significant of the chemical categories as a whole.

Study of the Different Processes for Recovery of the Extract

In the course of the extractions conducted with supercritical $CO_2$, the $CO_2$ is kept at the liquid/vapour equilibrium in the separator, the liquid $CO_2$ serving to retain the compounds extracted. The simultaneous presence of liquid $CO_2$ and oil in the separator must lead to the appearance of a single phase because of the miscibility properties between the two substances.

It was attempted to find if the capacity of the oil for retaining the compounds would be better, equal or less in the absence of liquid $CO_2$ in the separator. Extractions were therefore carried out in the absence of liquid $CO_2$ in the separator. The suppression of liquid $CO_2$ in the separator offers at least the double advantage of making the extractions easier to conduct and of reducing the let-down time of the separator. The let-down is a very violent phenomenon, in the course of which the main losses of volatile compounds are produced.

In the absence of liquid $CO_2$ in the separator there was cause to call the process for recovery of the extract into question again; the reduced quantity of $CO_2$ in the separator permits only very little or no formation of solid carbon dioxide. The two possible procedures for recovery of the extract were therefore retained, on the one hand drawing off the extract at the end of the extraction when the separator is still under pressure, and on the other hand cooling of the separator by sudden let-down was retained. The results obtained are given in Table 4:

than those obtained in the absence of liquid $CO_2$ and with solid carbon dioxide (Procedure 3).

Butyl acetate was also found in the oil. For this compound the best of the three procedures is Procedure 1. When the other procedures are applied, the butyl acetate content in the extract falls, especially in the case of Procedure 3.

The alcohol contents are higher when Procedure 1 or Procedure 3 is employed than with Procedure 2. On the other hand, the presence or absence of liquid $CO_2$ has practically no effect on the yields of the alcohols; in fact, no difference between Procedures 1 and 3 is observed for these compounds. The alcohols extracted are solubilized in the aqueous fraction present in the separator. The quantities of alcohols recovered are therefore going to depend on cooling and on the sudden let-down, which induce freezing of the water, which will imprison the alcohol.

There is also better recovery of $\gamma$-butyrolactone, especially with Procedures 1 and 3; Procedure 2 gives the most mediocre yield. Because of the polarity of the lactone, its behaviour follows that of the alcohol.

Amongst the hydrocarbons extracted, no difference is noted between Procedures 1 and 3 except in the case of $\alpha$-pinene, for which the yields are comparable whatever the method of recovery of the extract. The extracts obtained with Procedure 2 show a lower terpene hydrocarbon content.

The use of edible oil does not enable the presence of liquid $CO_2$ in the separator to be dispensed with. The (liquid $CO_2$ + oil) mixture has different and more advantageous properties than the oil alone since Procedure 1 offers the best yields of the three procedures.

Cooling of the separator followed by a sudden let-down is also preferable; the majority of the yields obtained by this method are better than those obtained by drawing off.

TABLE 4

Extraction of the model solution (SHV) with supercritical $CO_2$ (P = 150 bar and T = 36° C.) Study of the different means of carrying out the extraction at the separator level

| Compounds | PROCEDURE 1 Separator: Liquid $CO_2$ + oil + recovery of the extract: cooling and sudden let-down | | PROCEDURE 2 Separator: Liquid $CO_2$ − oil + recovery of the extract: drawing off | | PROCEDURE 3 Separator: Liquid $CO_2$ − oil + recovery of the extract: cooling and sudden let-down | |
|---|---|---|---|---|---|---|
| | $\overline{X}$ | VC | $\overline{X}$ | VC | $\overline{X}$ | VC |
| 2-Hexanone | 75 | 11 | 38 | 10 | 50 | 14 |
| Butyl acetate | 73 | 12 | 37 | 10 | 51 | 14 |
| 4-Methylpentanol | 68 | 9 | 43 | 10 | 61 | 3 |
| cis-hex-3-en-1-ol | 77 | 8 | 49 | 9 | 70 | 2 |
| 2-Hexanol | 76 | 7 | 45 | 10 | 71 | 3 |
| 2-Heptanone | 78 | 7 | 45 | 11 | 62 | 8 |
| $\gamma$-Butyrolactone | 44 | 21 | 21 | 3 | 39 | 22 |
| $\alpha$-Pinene | 29 | 36 | 15 | 26 | 20 | 12 |
| Camphene | 32 | 40 | 16 | 19 | 24 | 11 |
| Myrcene | 34 | 38 | 16 | 12 | 25 | 14 |
| $\alpha$-Phellandrene | 42 | 28 | 17 | 32 | 39 | 28 |
| Hexyl acetate | 75 | 2 | 35 | 18 | 46 | 16 |
| $\gamma$-Terpinene | 41 | 35 | 16 | 9 | 32 | 16 |

$\overline{X}$: mean of the yields (in percent)
VC: variation coefficient (in percent)

The ketones show high yields, especially in the presence of liquid $CO_2$ and when the extract is recovered in the form of solid carbon dioxide (Procedure 1) and their levels are twice as high as those obtained in the absence of liquid $CO_2$ and by drawing off (Procedure 2). The yields of these compounds are also significantly higher

EXAMPLE 2

Mode of Operation No. 2 and Material No. 2

The aim is to retain the volatile compounds extracted with supercritical $CO_2$ with the aid of twice-distilled glycerol added to the separator in order to produce glycerol enriched in aromatic compounds.

The addition of glycerol to the separator is reflected in the appearance of a new phase in the separator; in fact glycerol has very low solubility in liquid $CO_2$ (the solubility of glycerol in liquid $CO_2$ is 0.05% (w/w)).

A—Comparison of the Extraction with and without Glycerol

The data are reported in Table 5 below:

TABLE 5

Extraction of the model solution (SHV) with supercritical $CO_2$ (P = 50 bar and T = 36° C.) in the presence or absence of glycerol in the separator.

| Compounds | Quantities in the solution (in mg) | Control without glycerol X | Control without glycerol VC | Extractions with 200 ml of gylcerol X | Extractions with 200 ml of gylcerol VC |
|---|---|---|---|---|---|
| 2-hexanone | 0.8 | 40 | 96 | 75 | 19 |
| Butyl acetate | 0.9 | 15 | 25 | 62.5 | 23 |
| 4-Methylpentanol | 0.8 | 56 | 10 | 82.5 | 11 |
| cis-hex-3-en-1-ol | 0.8 | 71 | 20 | 76 | 5 |
| Hexanol | 0.8 | 64 | 24 | 83 | 3 |
| 2-Heptanone | 0.8 | 42 | 90 | 72 | 11 |
| γ-Butyrolactone | 1.0 | 67 | 0 | 55 | 8 |
| α-Pinene | 0.8 | 3.5 | 83 | 26 | 16 |
| Camphene | 0.8 | 3 | 150 | 35 | 15 |
| Myrcene | 0.8 | 3 | 147 | 28.5 | 22 |
| α-Phellandrene | 0.8 | 1 | 173 | 12.5 | 39 |
| Hexyl acetate | 0.9 | 28 | 20 | 65 | 13 |
| γ-Terpinene | 0.8 | 4 | 132 | 29 | 9 |

X: mean of the yields (in percent)
VC: variation coefficient (in percent)

Except for γ-butyrolactone, the compounds extracted glycerol in the separator. The alcohols have good extraction yields of around 80%. The hydrocarbons have extraction yields of the order of 30%, except for α-phellandrene for which the value is lower (about half). Nevertheless, because of the low rates of recovery of hydrocarbons in the absence of glycerol, the slightest improvement in the yields becomes significant for these compounds. The ketones also show improved extraction yields with glycerol. The multiplication factor is of the order of 2 for these compounds. The two compounds follow virtually the same development; the length of the carbon chain apparently plays no role. Butyl acetate and hexyl acetate are, likewise, better recovered in the presence of glycerol, the yields increasing by 2- to 3-fold.

The ketones and the esters therefore have very good yields in glycerol and are the two chemical categories which lend themselves best to extraction in the presence of glycerol. As the alcohols are already extracted well without glycerol, the value of glycerol remains less for these compounds.

Moreover, all the results show that the reproducibility of this extraction technique grows by the addition of glycerol in the separator.

B—Accumulation of Volatile Compounds in Glycerol

Experiments with a multiple charge of volatile compounds in the extractor were conducted in order to evaluate whether it is possible to obtain glycerol enriched in aromatic compounds with a higher degree of concentration.

The mode of operation is such that the charge of volatile compounds used is about 10 times higher than the preceding charge, from one experiment to the next.

Moreover, to eliminate the influence of the extraction time, all of the solutions are extracted for 12 hours. All of the residues analysed at the end of the extraction contained only less than 1% of each of the compounds, with the exception of γ-butyrolactone, the residual content of which fluctuates between 2 and 5%.

The results are given in Table 6.

TABLE 6

Extraction of the model solution (SHV) with supercritical $CO_2$ (P = 150 bar and T = 36° C.) in the presence of glycerol with various charges of volatile compounds

| | I | I | I | II | II | II | III | III | III |
|---|---|---|---|---|---|---|---|---|---|
| Compounds | Charge in mg | Quantity recovered (in mg) | Variation coefficient in % | Charge in mg | Quantity recovered (in mg) | Variation coefficient in % | Charge in mg | Quantity recovered (in mg) | Variation coefficient in % |
| 2-Hexanone | 0.8 | 0.6 | 19 | 7.0 | 5.7 | 12 | 70 | 47.0 | 6 |
| Butyl acetate | 0.9 | 0.6 | 23 | 7.4 | 5.5 | 13 | 74 | 44.4 | 14 |
| 4-Methylpentanol | 0.8 | 0.7 | 11 | 6.8 | 6.2 | 9 | 68 | 53.7 | 14 |
| cis-Hex-3-en-1-ol | 0.8 | 0.6 | 5 | — | — | — | — | — | — |
| Hexanol | 0.8 | 0.7 | 3 | 6.8 | 6.0 | 9 | 68 | 51.0 | 13 |
| 2-Heptanone | 0.8 | 0.6 | 11 | 6.2 | 5.0 | 12 | 62 | 42.2 | 12 |
| γ-Butyrolactone | 1.0 | 0.55 | 8 | 9.6 | 8.5 | 10 | 96 | 61.4 | 17 |
| α-Pinene | 0.8 | 0.2 | 16 | 7.2 | 1.3 | 31 | 72 | 46.1 | 24 |
| Camphene | 0.8 | 0.3 | 15 | 7.3 | 1.5 | 19 | 73 | 56.9 | 9 |
| Myrcene | 0.8 | 0.2 | 22 | 6.8 | 1.4 | 15 | 68 | 44.2 | 13 |
| α-Phellandrene | 0.8 | 0.1 | 39 | 7.1 | 1.0 | 48 | 71 | 43.3 | 23 |
| Hexyl acetate | 0.9 | 0.6 | 13 | 7.2 | 4.2 | 13 | 72.5 | 50.0 | 8 |
| γ-Terpinene | 0.8 | 0.2 | 9 | 7.8 | 1.8 | 13 | 78 | 50.7 | 13 |

The two ketones follow the same development as a function of the charge admitted to the extractor. It is found that the quantity of these compounds retained in the glycerol increases with the initial charge. This quantity remains proportional to the ketone content of the solution.

The quantities of alcohols recovered in the glycerol are equally high starting both from a 7 mg charge as from a 70 mg charge.

In the case of the esters, the quantities recovered increase with the charge admitted to the extractor. When the charge rises to about 70 mg, glycerol is able to retain up to 50 mg of hexyl.

Likewise, it is found that the quantity of γ-butyrolactone retained in the glycerol increases.

When the charge admitted is about 0.7 or 7 mg, the quantities of hydrocarbons retained are the lowest and are, respectively, between 0.1 and 0.3 mg or 1.3 and 1.8 mg, which places the yields of these compounds approximately between 12 and 28% in the two cases. On the other hand, when the charge employed is of the order of 70 mg, the quantities retained increase significantly, on average 50 mg of each of the hydrocarbons without distinction. Thus, the yields for these compounds rise to about 65%, being then largely more significant than with the first two charges.

In general, glycerol will retain more of the compounds the higher the concentration of these in the model solution.

The quantities of compounds used in these multiple charge experiments are such that it appeared necessary to compare the extractions conducted with 7 and 70 mg charges with control extractions of comparable charges carried out without the addition of glycerol. FIG. 5 illustrates these experiments.

Legend to FIG. 5: Histograms of the yields of the various chemical categories in the presence or absence of glycerol ☐ Control  ▨ Glycerol It would appear, firstly, that if the charge admitted influences the quantity recovered in the presence of glycerol, this is certainly true with the controls.

It is evident from these experiments that in the case of ketones the addition of glycerol brings a certain improvement relative to the control; it is the same in the case of the esters.

With regard to the alcohols, the 7 mg charge shows an advantageous effect of glycerol.

In the case of the terpene hydrocarbons, the addition of glycerol would appear to be entirely beneficial, whatever the charge employed. In the case of the control, the yields obtained with a 70 mg charge increase, but remain very substantially lower than those obtained in the presence of glycerol.

It would therefore appear that the rate of recovery increases in the presence of glycerol in the separator. At least one fraction of the compounds normally dissolved in the liquid $CO_2$ is found in the glycerol in proportions depending on the partition coefficient of each compound between the two phases. This partition coefficient reflects the capacity of glycerol for retaining the volatile compounds.

EXAMPLE 3 (A)

Mode of Operation No. 3 and Material No. 2.

The cyclodextrins are cyclic oligosaccharides comprising 6, 7 or 8 glycopyranose units. $\beta$-Cyclodextrin ($\beta$-CD), the most important and the most used of the group, comprises 7 glucopyranose units:

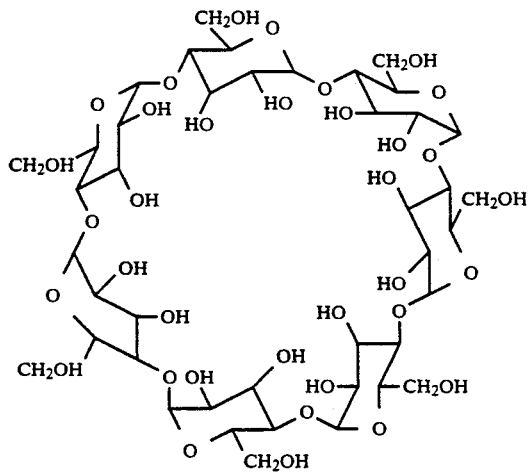

$\beta$-Cyclodextrin is soluble in water, all of the hydroxyl groups are on the external surface of the cycle and the internal cavity is slightly apolar.

(a) Formation of complexes under conventional conditions:

Initially the capacity of the compounds for forming complexes with the $\beta$-CDs under the conventional conditions for use of these complexing agents is measured. The results obtained are given in Table 7.

TABLE 7

| | Conventional formation of complexes between the model solution (SHV) and $\beta$-cyclodextrins | | | | |
|---|---|---|---|---|---|
| Compounds | Quantity in the solution in mg | A Percentage of compounds incorporated n the $\beta$-CD | Variation coefficient % | B Supernatant: Yield in % | Total contents of compounds in the $\beta$-CD = A + [100 − (A + B)] (in %) |
| 2-Hexanone | 0.8 | 40 | 16 | 50 | 50 |
| Butyl acetate | 0.9 | 56 | 24 | 33.5 | 66.5 |
| 4-Methylpentanol | 0.8 | 37 | 21 | 61 | 39 |
| cis-Hex-3-en-1-ol | 0.8 | 36 | 18 | 53 | 47 |
| Hexanol | 0.8 | 37.5 | 19 | 50 | 50 |
| 2-Heptanone | 0.8 | 60 | 20 | 28 | 72 |
| $\gamma$-Butyrolactone | 1.0 | 4 | 13 | 88 | 10 |
| $\alpha$-Pinene | 0.8 | 73 | 10 | 2.5 | 97.5 |
| Camphene | 0.8 | 72 | 11 | 3 | 97 |
| Myrcene | 0.8 | 78 | 5 | 3 | 97 |
| $\alpha$-Phellandrene | 0.8 | 75 | 8 | 4 | 96 |
| Hexyl acetate | 0.9 | 81 | 0 | 4 | 96 |
| $\gamma$-Terpinene | 0.8 | 75 | 1 | 6 | 94 |

On the first analysis it is ascertained that the proportion of complexes formed is variable and depends on the nature of the compound employed.

It would appear that the proportions of complexes formed are the highest (of the order of 75%) in the case of the hydrocarbons. The total (supernatant+$\beta$-CD) is less than 100%; about 20% of each hydrocarbon is missing due to the imperfect extraction by methylene chloride of the compounds incorporated in the $\beta$-CDs. The proportions of the complexes of these compounds must be around 95%, as indicated by the last column in Table 7.

(b) Comparison of Extractions with supercritical $CO_2$ conducted with and without $\beta$-cyclodextrins The results of the experiments conducted are collated in Table 8.

TABLE 8

Extractions of the model solution (SHV) with supercritical $CO_2$ (P = 150 bar and T = 36° C.) in the presence of β-cyclodextrins

| Compounds | Quantities in the model solution in mg | without β-cyclodextrins X̄ | without β-cyclodextrins VC | Extractions with 10 g of β-CD X̄ | Extractions with 10 g of β-CD VC |
|---|---|---|---|---|---|
| 2-Hexanone | 0.8 | 40 | 96 | 19 | 30 |
| Butyl acetate | 0.9 | 15 | 25 | 20 | 17 |
| 4-Methylpentanol | 0.8 | 56 | 10 | 17 | 12 |
| cis-Hex-3-en-1-ol | 0.8 | 71 | 20 | 19 | 32 |
| Hexanol | 0.8 | 64 | 20 | 25 | 24 |
| 2-Heptanone | 0.8 | 42 | 90 | 18 | 25 |
| γ-Butyrolactone | 1.0 | 67 | 0 | 3 | 45 |
| α-Pinene | 0.8 | 3.5 | 83 | 19 | 34 |
| Camphene | 0.8 | 3 | 150 | 19 | 30 |
| Myrcene | 0.8 | 3 | 147 | 26 | 38 |
| α-Phellandrene | 0.8 | 1 | 173 | 4 | 13 |
| Hexyl acetate | 0.9 | 28 | 20 | 38 | 35 |
| γ-Terpinene | 0.8 | 4 | 132 | 15 | 27 |

X̄: mean of yields (in percent)
VC: variation coefficient (in percent)

Most of the compounds have rates of formation of complex of the order of 20%. An extract having an equilibrated chromotographic profile is obtained.

γ-Butyrolactone is the only compound to have a very low yield, forming very little complex with β-CDs. This phenomenon is akin to that observed during the experiments carried out under conventional conditions for the use of β-CDs.

The repeatability of the method of extraction is improved in the presence of β-CDs since the variation coefficients are all below 36%. This is particularly true in the case of the hydrocarbons, the variability of which is greatly reduced relative to the control.

In consideration of the quantity of volatile compounds present in the model solution, which is less than that of the β-CDs, the pool of cyclodextrins may not be saturated with volatile compounds and a good number of β-CDs is not in the form of complexes with the volatile compounds. The quantity of volatile compounds extracted was then increased in order to measure the influence of the content of volatile compounds in the model solution on the quantity of complexes formed and to evaluate the limits of the β-CDs.

(c) Accumulation of volatile compounds in the β-cyclodextrins

The accumulation data are collated in Table 9.

TABLE 9

Extraction of the model solution (SHV) with supercritical $CO_2$ (P = 150 bar and T = 36° C.) in the presence of β-cyclodextrins, with various charges of volatile compounds

| Compounds | I Charge in mg | I X̄ | I CV | II Charge in mg | II X̄ | II CV | III Charge in mg | III X̄ | III CV |
|---|---|---|---|---|---|---|---|---|---|
| 2-Hexanone | 0.8 | 19 (0.15 mg) | 30 | 7.0 | 43 (3.0 mg) | 18 | 70 | 25 (17.5 mg) | 3 |
| Butyl acetate | 0.9 | 20 (0.2 mg) | 17 | 7.4 | 56 (4.1 mg) | 11 | 74 | 31.5 (23.3 mg) | 7 |
| 4-Methylpentanol | 0.3 | 17 (0.13 mg) | 12 | 6.8 | 42 (2.8 mg) | 9 | 68 | 39 (26.5 mg) | 5 |
| cis-Hex-3-en-1-ol | 0.8 | 19 (0.15 mg) | 32 | — | — | — | — | — | — |
| Hexanol | 0.8 | 25 (0.2 mg) | 24 | 6.9 | 50 (3.4 mg) | 10 | 63 | 50 (34.0 mg) | 3 |
| 2-Heptanone | 0.8 | 18 (0.15 mg) | 25 | 6.2 | 59 (3.6 mg) | 8 | 62 | 34 (21.0 mg) | 3 |
| γ-Butyrolactone | 1.0 | 4 (0.04 mg) | 43 | 9.6 | 6 (0.6 mg) | 57 | 96 | 8 (7.7 mg) | 25 |
| α-Pinene | 0.8 | 19 (0.15 mg) | 34 | 7.2 | 40 (2.9 mg) | 23 | 72 | 50 (36.0 mg) | 7 |
| Camphene | 0.8 | 19 (0.15 mg) | 30 | 7.3 | 41.5 (3.0 mg) | 22 | 73 | 52 (38.0 mg) | 11 |
| Myrcene | 0.8 | 26 (0.2 mg) | 38 | 6.8 | 48 (3.2 mg) | 15 | 68 | 57 (38.7 mg) | 6 |
| α-Phellandrene | 0.8 | 4 (0.03 mg) | 13 | 7.1 | 39 (2.7 mg) | 21 | 71 | 53 (37.6 mg) | 8 |
| Hexyl acetate | 0.9 | 38 (0.3 mg) | 35 | 7.2 | 66 (4.7 mg) | 11 | 72.5 | 54 (39.1 mg) | 20 |
| γ-Terpinene | 0.8 | 15 (0.12 mg) | 27 | 7.8 | 37 (2.9 mg) | 27 | 78 | 55 (42.9 mg) | 5 |

| Compounds | IV Charge in mg | IV X̄ | IV CV | V Charge in mg | V X̄ | V CV |
|---|---|---|---|---|---|---|
| 2-Hexanone | 682 | 16 (109.1 mg) | 17 | 2.96 | 5.7 (168.7 mg) | 6 |
| Butyl acetate | 772 | 21 (162.1 mg) | 7 | 3.21 | 6 (192.1 mg) | 11 |
| 4-Methylpentanol | 589 | 24 (141.3 mg) | 12 | — | — | — |
| cis-Hex-3-en-1-ol | — | — | — | — | — | — |
| Hexanol | 698 | 23 (160 mg) | 6 | 2.94 | 7 (205 mg) | 10 |
| 2-Heptanone | 696 | 24 (167 mg) | 9 | 3.02 | 7 (211.4 mg) | 20 |
| γ-Butyrolactone | 820 | 7 (57 mg) | 15 | 4.10 | 2.5 (102.5 mg) | 28 |
| α-Pinene | 814 | 41 | 17 | 3.17 | 9.5 | 14 |

TABLE 9-continued

Extraction of the model solution (SHV) with supercritical $CO_2$
(P = 150 bar and T = 36° C.) in the presence of
β-cyclodextrins, with various charges of volatile compounds

|  |  | (333 mg) |  |  | (301 mg) |  |
|---|---|---|---|---|---|---|
| Camphene | 741 | 42 | 6 | 3.17 | 11 | 6 |
|  |  | (311 mg) |  |  | (348 mg) |  |
| Myrcene | 726 | 40 | 14 | 2.99 | 10 | 14 |
|  |  | (290.4 mg) |  |  | (299 mg) |  |
| α-Phellandrene | 735 | 51 | 14 | 3.10 | 11 | 6 |
|  |  | (374 mg) |  |  | (341 mg) |  |
| Hexyl acetate | 754 | 38 | 15 | 3.19 | 11.7 | 0 |
|  |  | (286 mg) |  |  | (350 mg) |  |
| γ-Terpinene | 779 | 39 | 11 | 3.12 | 9 | 15 |
|  |  | (303 mg) |  |  | (280 mg) |  |

X: mean of yields (in percent)
VC: variation coefficient (in percent)

It is evident that the increase in the mean charge to about 7 mg for each of the compounds favours the formation of complexes. The percentages of included complexes increase for all of the compounds. The greatest increase relates to the group of terpene hydrocarbons. With regard to the ketones, the percentage of complexes formed with β-CD has doubled, as is the case for the esters and the alcohols.

These increases may be explained by a better probability of the β-CDs meeting the volatile compounds.

If the charge of each compound is again multiplied by 10, the percentages obtained remain high. Fisher's analysis does not show significant variations in the yields overall relative to the preceding experiment. The terpene hydrocarbons form complexes in significant proportions which, for these compounds, notably improve their yields and show the value of using β-CDs to retain these highly volatile compounds. About 50% of the hydrocarbons are thus recovered despite the sudden decompression step.

Finally, extractions were conducted with mean contents of 3 g for each of the compounds. The yields obtained have a low significance for the compounds as a whole. The proportions of complexes formed is between 6 and 11%, except for γ-butyrolactone. These results confirm the saturation of the β-CDs. If the global molar ratio is followed as a function of the total quantity of compounds present in the extractor (FIG. 6), it is found that a plateau appears when the ratio reaches the value of about 2.4. The addition of volatile compounds does not significantly modify the molar ratio.

Figure 6:
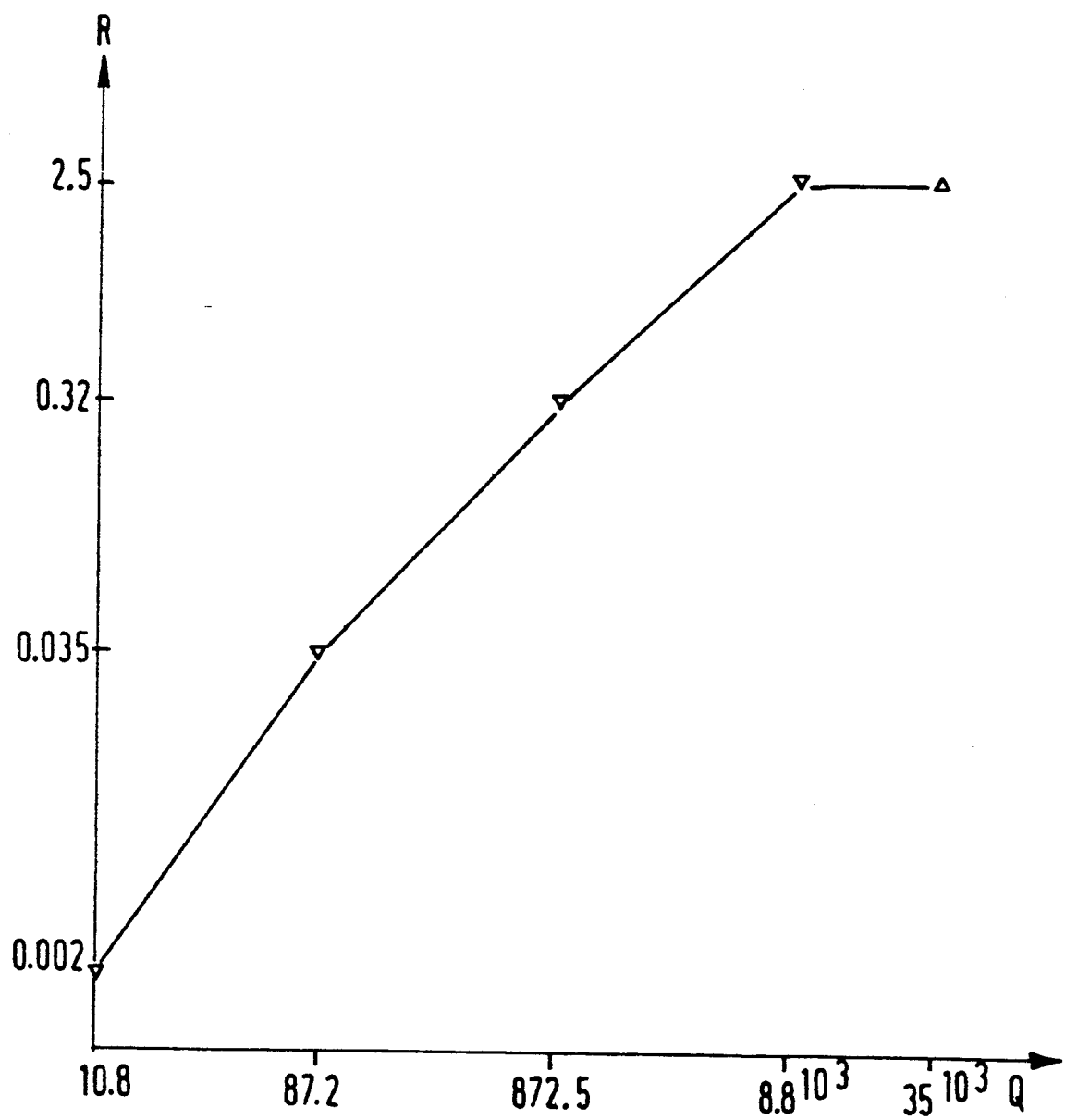

Legend to FIG. 6:
Abscissae Total quantity of volatile compounds Q (in mg);
Ordinates: Molar ratio R (moles of compounds/moles of β-CD).

Figure 7:
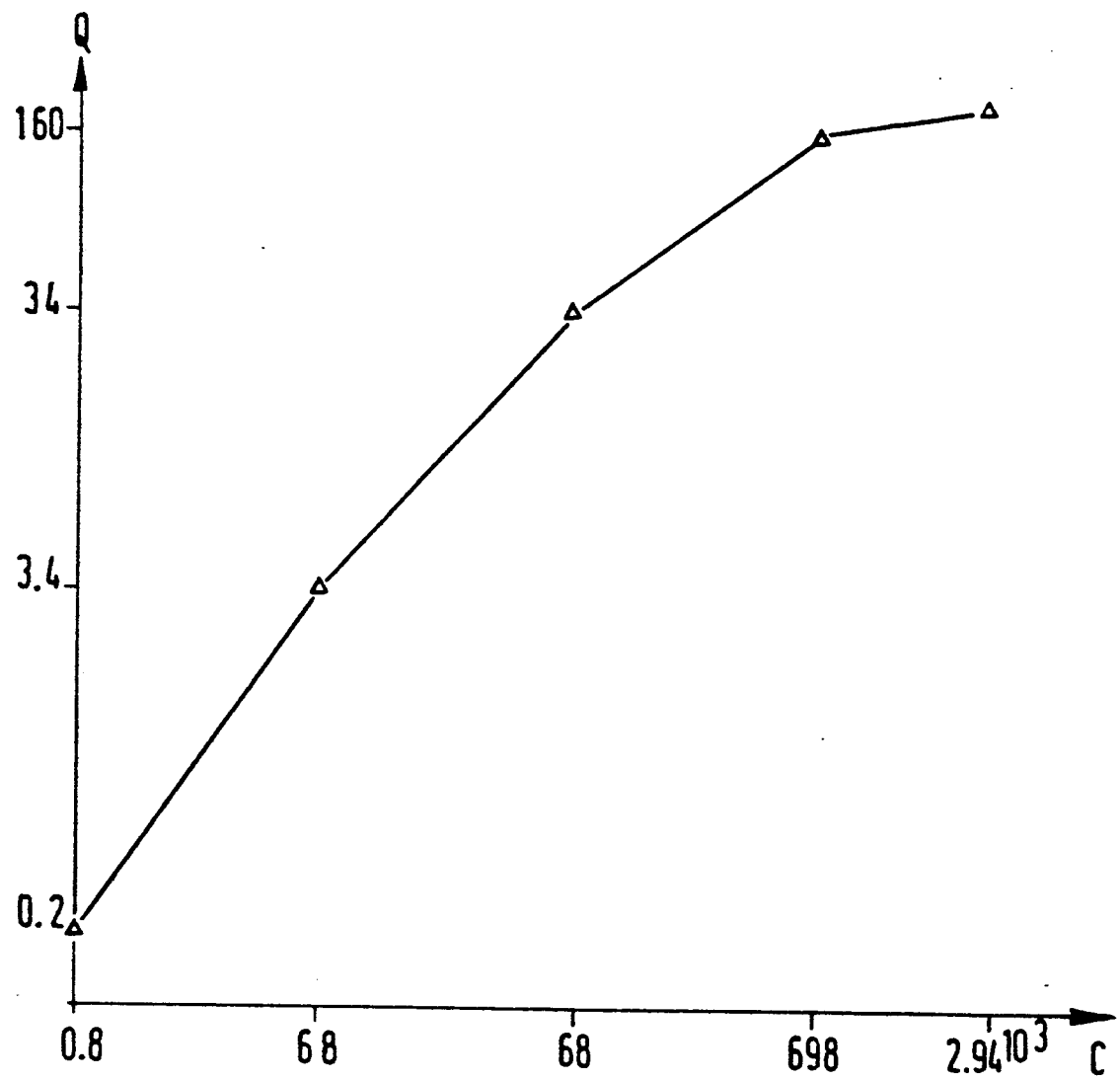
Figure 8:
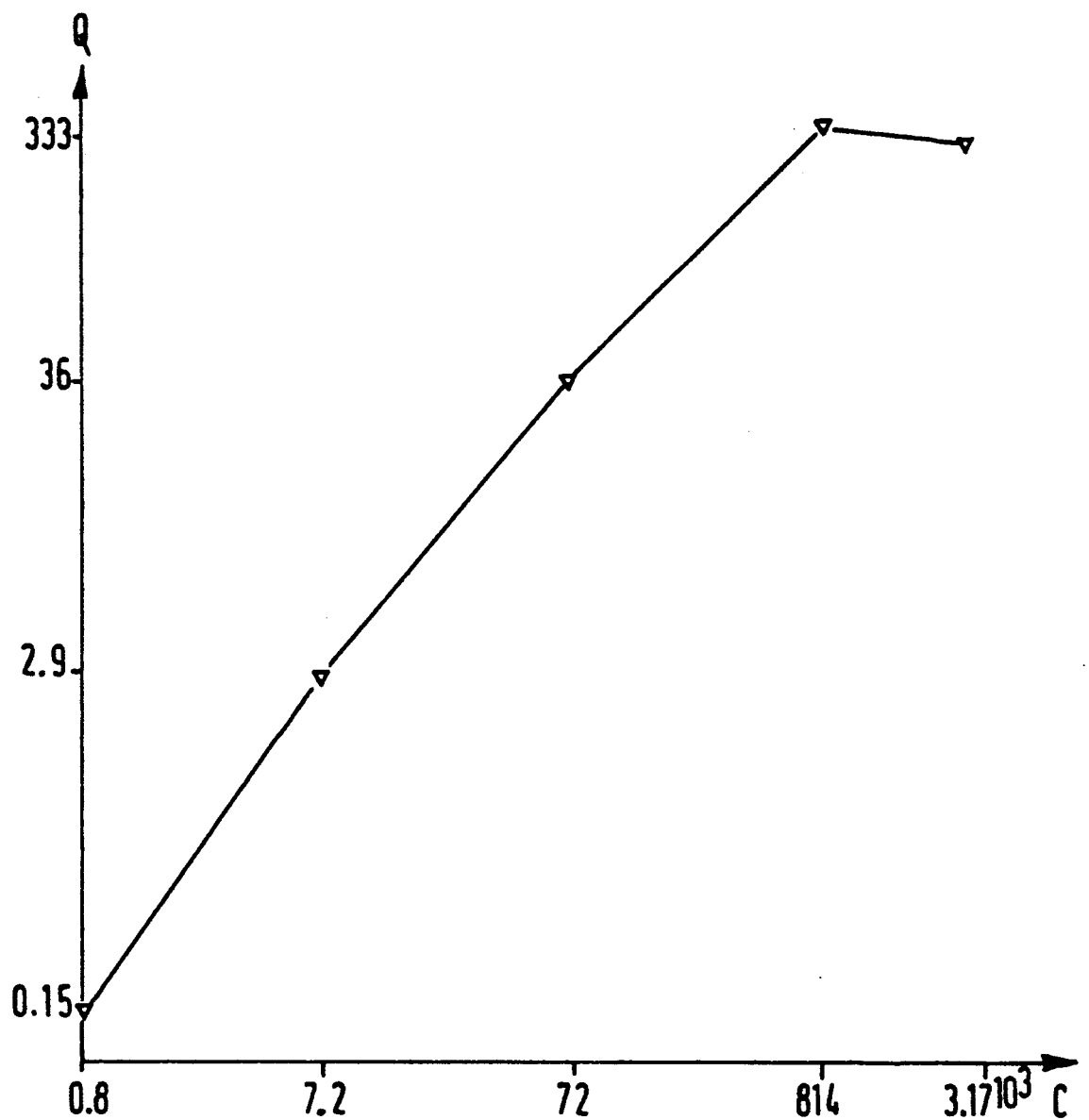
Figure 9:
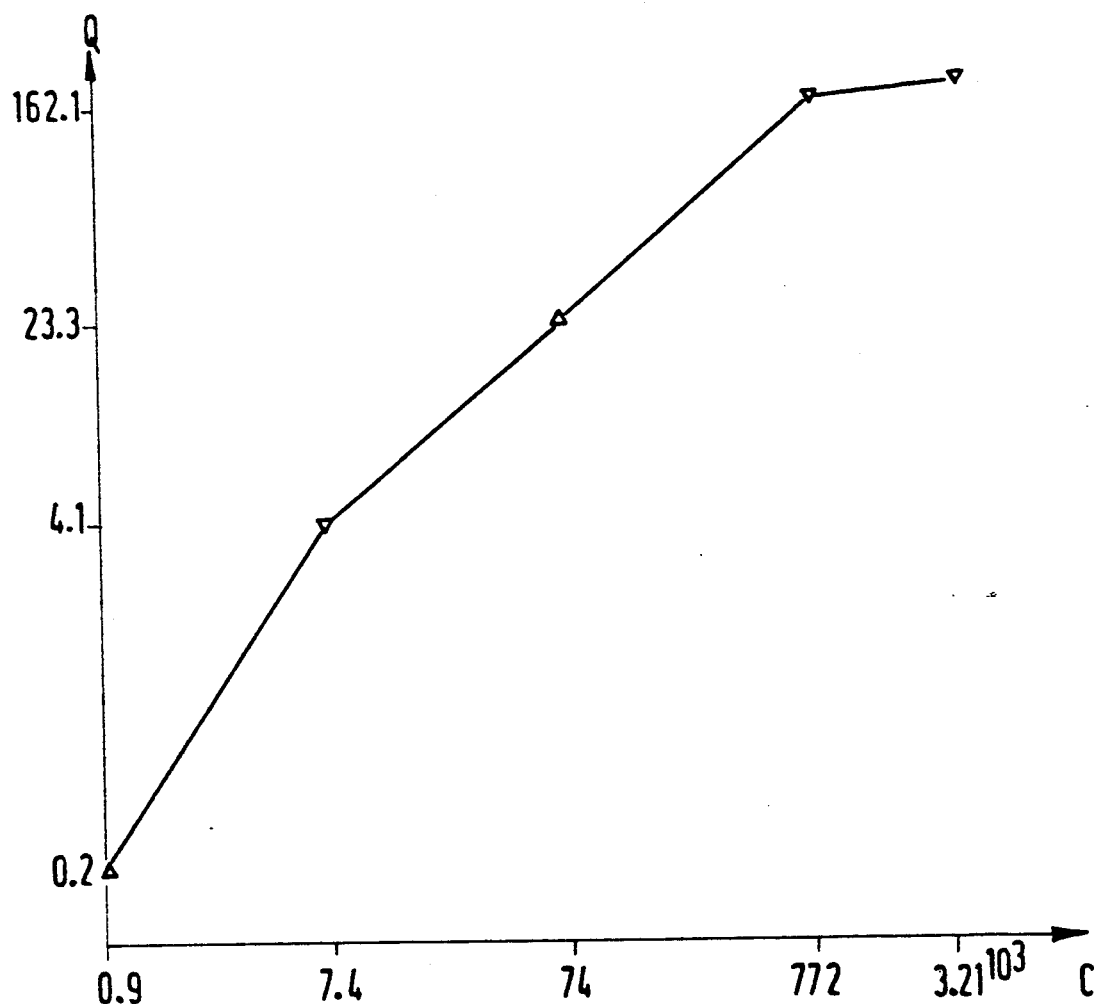
Figure 10:
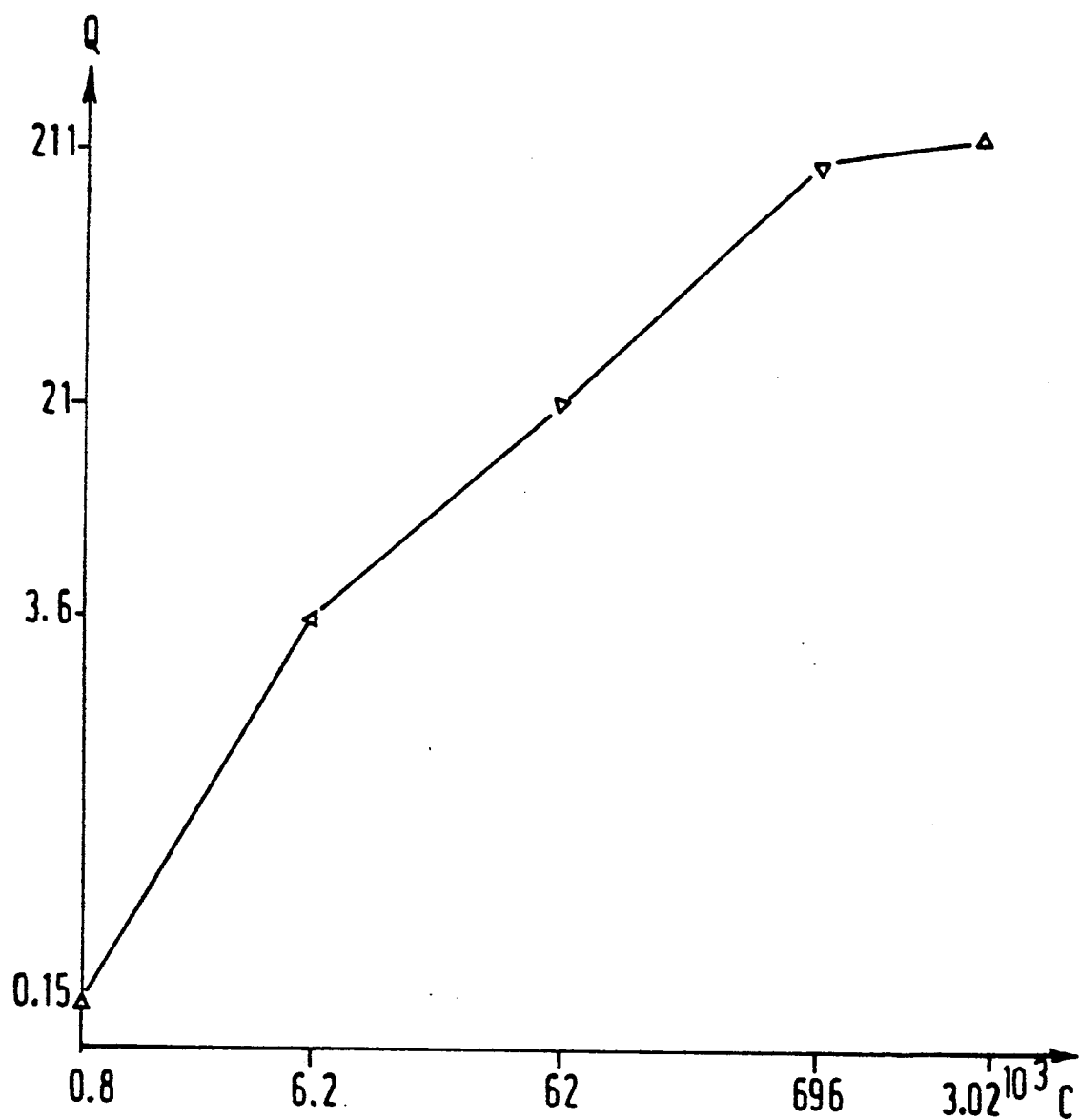

The development of the yield of a compound of each chemical category was also analysed as a function of its quantity in the model solution (FIGS. 7 for hexanol, 8 for α-pinene, 9 for butyl acetate and 10 for 2-heptanone).

Legend to FIGS. 7 to 10:
Abscissae: Charge C of compound (in mg);
Ordinates: Quantity Q retained in 10 mg of β-CD.

Whatever the chemical category, all of the compounds retained follow a process comparable to the development of the global content, that is to say a regular increase in the proportion of complexes formed until a plateau is reached, which is more or less high depending on the compound.

EXAMPLE 3 (B)

Mode of Operation No. 1 to 3 and Material No. 3

In the study of the extraction of raspberry juices with supercritical $CO_2$, Forane 11 was preferred to methylene chloride. The reasons for this choice are associated with the supplementary step of concentrations of 1 ml to 100 μl of the extracts obtained with supercritical $CO_2$. The aroma concentrates recovered by extraction with supercritical $CO_2$ were extracted firstly with Forane 11 and then, secondly, by a methylene chloride extraction. This supplementary extraction enables the compounds to be determined which are not or are only slightly entrained by Forane 11, such as frambinone.

The extractions were conducted on 800 g of raspberries and also on 2 kg of fruit to measure the influence of the charge on the extraction yields.

In the Presence of Oil or of Glycerol

Starting from 800 g of fruit a) Forane 11 fractions (Table 10):

TABLE 10

Extraction of raspberry juice with supercritical
$CO_2$ (P = 150 bar and T = 36° C.).
Neutral volatile constituents identified

| COMPOUNDS | Control | | Extractions with 200 ml of glycerol | | Extractions with 200 ml of oil | |
|---|---|---|---|---|---|---|
|  | X (μg) | VC (%) | X (μg) | VC (%) | X (μg) | VC (%) |
| HYDROCARBONS | | | | | | |
| α-Pinene | — | | 1.5 | 13 | 4.2 | 40 |
| Myrcene | — | | — | — | 2 | 29 |
| p-Cymene | — | | 1.8 | 25 | 2.2 | 20 |
| β-Phellandrene | — | | — | — | 2.6 | 24 |
| Caryophyllene | — | | — | — | 1.8 | 17 |
| α-Humulene | n.d. | | n.d. | n.d. | n.d. | |

TABLE 10-continued

Extraction of raspberry juice with supercritical $CO_2$ (P = 150 bar and T = 36° C.).
Neutral volatile constituents identified

| COMPOUNDS | Control X (μg) | Control VC (%) | Extractions with 200 ml of glycerol X (μg) | Extractions with 200 ml of glycerol VC (%) | Extractions with 200 ml of oil X (μg) | Extractions with 200 ml of oil VC (%) |
|---|---|---|---|---|---|---|
| ESTERS | | | | | | |
| Ethyl acetate | n.d. | | n.d. | n.d. | | |
| Isoamyl acetate | — | | — | — | 1.2 | 20 |
| Isopentenyl acetate | 3.4 | 18 | 5.8 | 14 | 5.6 | 20 |
| Ethyl hexanoate | | | | | | |
| cis-Hex-3-en-1-yl acetate | 1.3 | 17 | 2.3 | 5 | 5 | 29 |
| Hexyl acetate | 3.5 | 51 | — | | 4.7 | 11 |
| Ethyl 5-hydroxy-octanoate | 0.7 | 71 | 0.8 | 2 | 1 | 43 |
| Menthyl acetate | n.d. | | n.d. | | n.d. | |
| Ethyl 5-hydroxy-decanoate | 7.6 | 18 | 10.3 | 10 | 12.6 | 14 |
| | n.d. | | n.d. | | n.d. | |
| ALDEHYDES | | | | | | |
| Pentanal | n.d. | | n.d. | n.d. | n.d. | |
| Hexanal | 102 | 89 | 116.7 | 47 | 77 | 24 |
| Heptanal | 2.6 | 91 | 2.7 | 19 | 11 | 4 |
| Benzaldehyde | — | | — | | 2.1 | 25 |
| Octanal | 4.2 | 54 | 6.8 | 14 | 9 | 18 |
| Nonanal | 13.3 | 69 | 28.5 | 27 | 19.4 | 20 |
| Decanal | n.d. | | n.d. | | n.d. | |
| Geranial | 1.3 | 7.4 | 1.5 | 24 | — | |
| Nona-2,4-dienal | n.d. | | n.d. | | n.d. | |
| KETONES | | | | | | |
| 2-Heptanone | 1.4 | 37 | 2.8 | 6 | 3.2 | 19 |
| Cyclohexanone | n.d. | | n.d. | | n.d. | |
| 2-Nonanone | n.d | | n.d. | | n.d. | |
| Dihydro-α-ionone | 1.7 | 36 | 1.9 | 20 | 2.1 | 25 |
| α-Ionone | 7.7 | 11 | 19.6 | 3 | 19.8 | 19 |
| β-Ionone | 10.2 | 28 | 26.8 | 8 | 28.5 | 13 |
| Gingerone | 6.9 | | 5.1 | 24 | 2.8 | 66 |
| ALCOHOLS | | | | | | |
| Pentanol | n.d. | | n.d. | | n.d. | |
| 3-Methylbutanol | n.d. | | n.d. | | n.d. | |
| 3-Methylbut-2-en-1-ol | n.d. | | n.d. | | n.d. | |
| cis-Hex-3-en-1-ol | 8.5 | 45 | 12.3 | 20 | 5.9 | 26 |
| Hexanol | 3.8 | 20 | 6.7 | 15 | 8.5 | 23 |
| 2-Heptanol | 5.5 | 25 | 9.8 | 28 | 8.9 | 25 |
| Heptanol | 1.7 | 31 | — | | 1.2 | 39 |
| Octanol | 2 | 41 | 3.1 | 39 | 2.7 | 23 |
| Linalol | 3.5 | 13 | 5.1 | 16 | 4.8 | 19 |
| 2-Phenylethanol | n.d. | | n.d. | | n.d. | |
| Menthenol | n.d. | | n.d. | | n.d. | |
| Nonanol | n.d. | | n.d. | | n.d. | |
| 4-Terpinenol | 4.4 | 11 | 5.7 | 15 | 5.4 | 28 |
| 8-p-Cymenol | 1.3 | 13 | 1.5 | 28 | 1 | 28 |
| α-Terpineol | 2.4 | 22 | 5.7 | 1.5 | 3.5 | 21 |
| Myrtenol | 1 | 47 | — | | — | |
| Piperitol | 0.9 | 23 | 4.8 | 8 | 0.8 | 28 |
| Nerol | 2.8 | 15 | 3.7 | 16 | 3.1 | 33 |
| Geraniol | 350 | 17 | 358.3 | 11 | 353.3 | 26 |
| LACTONES | | | | | | |
| γ-Butyrolactone | n.d. | | n.d. | | n.d. | |
| γ-Hexalactone | 13.1 | 22 | 17.1 | 29 | 10.8 | 45 |
| γ-Octalactone | 6.2 | 65 | 10.6 | 22 | 3.6 | 45 |
| δ-Octalactone | 40.4 | 26 | 49 | 5 | 48 | 53 |
| γ-Nonalactone | 5.1 | 65 | 10.3 | 20 | 7.4 | 32 |
| δ-Decalactone | 62.2 | 29 | 92 | 23 | 153.1 | 21 |
| Dihydroactinidiolide | n.d. | | n.d. | | n.d. | |
| ETHERS | | | | | | |
| Cineole | 1.5 | 8 | 1.6 | 15 | 1.5 | 22 |

X = mean of the quantities obtained
VC = variation coefficient
n.d. = compound not determined The analysis of the extracts obtained starting from 800 g of fruit shows that hydrocarbons are not found in the control extract. These compounds, which are already very difficult to retain in the separator, have weaker concentrations in the raspberry juice. Moreover, it is for this reason that these compounds were among the last to be detected in raspberries. Only some of the hydrocarbons are recovered in glycerol, but it is particularly in oil that the hydrocarbon contents are the best.

Despite the absence of cis-hex-3-enyl acetate, glycerol permits good recovery of the esters. However, it is with oil that the yields are the highest for these compounds. Moreover, oil is the only trapping medium to confine isoamyl acetate.

Mention should also be made of the presence in the extracts of ethyl 5-hydroxyoctanoate and ethyl 5-hydroxydecanoate, two highly fragrant esters detected for the first time in raspberries by solvent extraction and then by extraction with supercritical $CO_2$. Taking account of the instability attributed to these compounds, extraction with supercritical $CO_2$ would appear to be a sufficiently gentle method to avoid the conversion of these compounds into lactones.

On the other hand, for the recovery of aldehydes, glycerol would appear to be superior to oil, which gives, even globally, lower yields than those obtained with the control. However, it should be noted that benzaldehyde is not present in the extract obtained in the presence of oil. The presence in the extracts of nona-2,4-dienal (not determined), which, to the knowledge of the inventors, has never previously been mentioned in raspberry flavouring, should also be pointed out. This compound has a "green" odour rating with a very low perception threshold ($2.5 \times 10^{-7}$ mg/1).

In the case of the ketones, the improvements brought by glycerol and oil are significant; in particular the quantity of α-ionone recovered is significantly improved in the presence of these two media. According to the studies conducted previously with the model solutions, the rates of recovery of α-ionone are very high and do not necessitate the additional assistance of a retention medium. However, the results obtained starting from raspberry juice show that the presence of a trapping medium enables the quantity of α-ionone recovered to be doubled. The explanation lies in the differences in the quantities of α-ionone present in the mobile solution and in the raspberry juice. The losses of α-ionones measured during the tests with the model solution are less consistent than those observed during the extraction of raspberry juice. In fact, the concentration of α-ionone is at least 20 times weaker in this juice than in the model solution.

The recovery of lactones also shows a very clear improvement in the presence of trapping media. The most noteworthy compound is δ-decalactone, another major compound in the extract, which possesses a typical coconut odour. This compound is recovered better in oil, which therefore shows itself to be more efficient in respect of having not very important side chain.

b) Methylene Chloride fraction:

TABLE 11

Extraction of raspberry juice with supercritical $CO_2$ (P = 150 bar and T = 36° C.).
Neutral volatile constituents identified

| COMPOUNDS | Control | | Extractions with 200 ml of glycerol | | Extractions with 200 ml of oil | |
|---|---|---|---|---|---|---|
| | X (μg) | VC (%) | X (μg) | VC (%) | X (μg) | VC (%) |
| ESTERS | | | | | | |
| Menthyl acetate | n.d | | n.d. | | n.d. | |
| ALDEHYDES | | | | | | |
| Hexanal | 11 | 72 | 16 | 34 | 4 | 12 |
| Heptanal | n.d. | | n.d. | | n.d. | |
| Nonanal | 14 | 80 | 19 | 50 | — | |
| Nona-2,4-dienal | n.d. | | n.d. | | n.d. | |
| KETONES | | | | | | |
| α-Ionone | 1.5 | 23 | 1 | 28 | 1.6 | 39 |
| β-Ionone | 1.3 | 65 | 4.1 | 31 | 3.6 | 38 |
| Frambinone | 8.5 | 30 | 26 | 10 | 18 | 4 |
| Gingerone | 2.5 | 2 | 8.6 | 26 | 6.6 | 11 |
| ALCOHOLS | | | | | | |
| 3-Methylbut-2-en-1-ol | n.d. | | n.d. | | n.d. | |
| cis-Hex-3-en-1-ol | 3.9 | 61 | 4.3 | 41 | 4.1 | 11 |
| Hexanol | 0.7 | 2 | 1.1 | 10 | 1.4 | 19 |
| Benzyl alcohol | 1.7 | 25 | 3.3 | 14 | 2.1 | 10 |
| 2-Phenylethanol | 1 | 48 | 2.7 | 9 | 1 | 49 |
| Geraniol | 8 | 44 | 3.4 | 34 | 0.3 | 28 |
| LACTONES | | | | | | |
| γ-Butyrolactone | 5.1 | 43 | 6.3 | 28 | 5 | 32 |
| γ-Hexalactone | 13 | 45 | 13 | 19 | 13.8 | 31 |
| δ-Octalactone | n.d. | | n.d. | | n.d. | |
| δ-Decalactone | 7.8 | 56 | 8.1 | 18 | 0.9 | 10 |

X = mean of the quantities obtained
VC = variation coefficient
n.d. = compound not determined In the fraction obtained with methylene chloride, it is mainly the case of frambinone which is of interest. For this compound, which is important for the aroma of raspberries, the addition of glycerol or of oil in the separator enables the quantities recovered to be considerably increased. It is noted that for two alcohols weakly extracted by Forane 11, benzyl alcohol and 2-phenylethanol, the addition of glycerol improves the rates of recovery while oil has virtually no influence on the yields of these two compounds.

According to Table 12 below, in which the gains in the recovery of the various chemical categories effected by the trapping media are shown, it is evident that the chemical category for which the gains are the highest is that of the ketones. The mean polarity of these compounds must explain, at least in part, the similarity of their yields in glycerol and in oil.

TABLE 12

Extraction of raspberry juice with super-critical $CO_2$ $$\text{Gains obtained} = \frac{\text{Quantity (trapping medium)} - \text{quantity (control)}}{\text{Quantity (control)}} \times 100$$

| EXTRACTS | | HYDROCARBONS | ESTERS | ALDEHYDES | KETONES | ALCOHOLS | LACTONES |
|---|---|---|---|---|---|---|---|
| 800 g of fruits | glycerol | >>100% | 16% | 29% | 130% | 7% | 35% |
| | oil | >>100% | 82% | −17% | 106% | 1% | 58% |
| 2 kg of fruit | glycerol | >>100% | 28% | 14% | 40% | 38% | 145% |
| | oil | >>100% | 30% | −1% | 7% | 8% | 89% |

Starting from 2 kg of fruit a) Forane 11 fraction (Table 13)

TABLE 13

Extraction of raspberry juice with supercritical $CO_2$ (P = 150 bar and T = 36° C.).
Neutral volatile constituents identified

| COMPOUNDS | Control | | Extractions with 200 ml of glycerol | | Extractions with 200 ml of oil | |
|---|---|---|---|---|---|---|
| | X (μg) | VC (%) | X (μg) | VC (%) | X (μg) | VC (%) |
| HYDROCARBONS | | | | | | |
| α-Pinene | 0.1 | 173 | 2.8 | 43 | 4.8 | 11 |
| Myrcene | — | | — | — | 2.1 | 12 |
| p-Cymene | — | | — | — | 0.6 | 29 |
| β-Phellandrene | — | | 4.1 | 27 | 3.9 | 6 |
| Caryophyllene | 0.7 | 56 | 1.4 | 38 | 3.9 | 22 |
| α-Humulene | n.d. | | n.d. | n.d. | n.d. | |
| ESTERS | | | | | | |
| Ethyl acetate | n.d. | | n.d. | n.d. | n.d. | |
| Isoamyl acetate | — | | 0.9 | 40 | 1.9 | 34 |
| Isopentenyl acetate | 30.7 | 69 | 42 | 19 | 42 | 28 |
| Ethyl hexanoate | | | | | | |
| cis-Hex-3-en-1-yl acetate | 2.7 | 79 | 5.2 | 20 | 4.6 | 19 |
| | 5.7 | 50 | 7 | 10 | 8.7 | 24 |
| Ethyl 5-hydroxy-octanoate | n.d. | | n.d. | | n.d. | |
| Menthyl acetate | | | | | | |
| Ethyl 5-hydroxy-decanoate | 60 | 45 | 72 | 10 | 72 | 37 |
| | n.d. | | n.d. | | n.d. | |
| ALDEHYDES | | | | | | |
| Pentanal | n.d. | | n.d. | | n.d. | |
| Hexanal | 253 | 33 | 270.5 | 31 | 229.8 | 38 |
| Heptanal | 2.9 | 51 | 4.6 | 13 | 9 | 11 |
| Benzaldehyde | — | | — | — | 2.9 | 12 |
| Octanal | 3.4 | 61 | 4 | 9 | 5.5 | 36 |
| Nonanal | 20 | 39 | 37 | 19 | 31 | 27 |
| Decanal | n.d. | | n.d. | | n.d. | |
| Geranial | n.d. | | n.d. | | — | |
| Nona-2,4-dienal | n.d. | | n.d. | | n.d. | |
| KETONES | | | | | | |
| 2-Heptanone | 5.8 | 61 | 10.2 | 16 | 7.9 | 13 |
| Cyclohexanone | n.d. | | n.d. | | n.d. | |
| 2-Nonanone | n.d. | | n.d. | | n.d. | |
| Dihydro-α-ionone | 3.1 | 19 | 3.8 | 21 | 3.3 | 24 |
| α-Ionone | 46 | 39 | 57.6 | 3 | 46 | 23 |
| β-Ionone | 76.5 | 45 | 87 | 3 | 82 | 20 |
| Gingerone | 21.2 | 29 | 21.6 | 22 | 19 | 19 |
| ALCOHOLS | | | | | | |
| Pentanol | n.d. | | n.d. | | n.d. | |
| 3-methylbutanol | n.d. | | n.d. | | n.d. | |
| 3-Methylbut-2-en-1-ol | n.d. | | n.d. | | n.d. | |
| cis-Hex-3-en-1-ol | 17.5 | 41 | 19 | 8 | 12.4 | 33 |
| Hexanol | 4.4 | 39 | 8.3 | 13 | 6.9 | 21 |
| 2-Heptanol | 23.4 | 42 | 36 | 18 | 29 | 6 |
| Heptanol | 2.8 | 45 | 3.6 | 18 | 3 | 27 |
| Octanol | 3 | 53 | 4.3 | 9 | 3.6 | 17 |
| Linalol | 44.2 | 49 | 61.6 | 7 | 56.7 | 31 |
| 2-Phenylethanol | 15 | 3 | 20 | 25 | 11 | 27 |
| Menthenol | n.d. | | n.d. | | n.d. | |
| Nonanol | n.d. | | n.d. | | n.d. | |
| 4-Terpinenol | 24.6 | 37 | 39.4 | 14 | 30 | 11 |
| 8-p-Cymenol | — | | 6.2 | 13 | 2.9 | 33 |
| α-Terpineol | 13.4 | 44 | 20.4 | 9 | 18 | 15 |
| Myrtenol | 0.6 | 39 | 1.1 | 16 | 1 | 25 |
| Piperitol | 1.5 | 44 | 1.9 | 27 | 2.1 | 18 |

TABLE 13-continued

Extraction of raspberry juice with supercritical
$CO_2$ (P = 150 bar and T = 36° C.).
Neutral volatile constituents identified

| COMPOUNDS | Control X (µg) | Control VC (%) | Extractions with 200 ml of glycerol X (µg) | Extractions with 200 ml of glycerol VC (%) | Extractions with 200 ml of oil X (µg) | Extractions with 200 ml of oil VC (%) |
|---|---|---|---|---|---|---|
| Nerol | 25.3 | 40 | 35.4 | 16 | 27 | 5 |
| Geraniol | 700.2 | 5 | 941.2 | 18 | 716.1 | 27 |
| LACTONES | | | | | | |
| γ-Butyrolactone | n.d. | n.d. | n.d. | | n.d. | |
| γ-Hexalactone | 41.3 | 28 | 51.5 | 16 | 34 | 7 |
| γ-Octalactone | 5.1 | 49 | 18 | 29 | 12 | 31 |
| δ-Octalactone | 117.2 | 15 | 323.3 | 30 | 213 | 51 |
| γ-Nonalactone | 5.9 | 41 | 7.3 | 20 | 5.5 | 22 |
| δ-Decalactone | 135.6 | 6 | 316 | 18 | 302.5 | 37 |
| Dihydroactinidiolide | n.d. | n.d. | n.d. | | n.d. | |
| ETHERS | | | | | | |
| Cineole | 2.6 | 20 | 4 | 14 | 5.5 | 79 |

X = mean of the quantities obtained
VC = variation coefficient
n.d. = compound not determined Starting from 2 kg of raspberries, only some of the hydrocarbons are recovered in the control, mainly caryophyllene.

Better yields are obtained for these compounds in glycerol and oil. In the case of glycerol, the rates of recovery with 2 kg of raspberries are better than with 800 g, although with oil the yields show little difference between the two experiments. In the case of the esters, the two trapping media are comparable. The isopentyl acetate and methyl acetate contents increase enormously, more than could be forecast from the increase in the charge of raspberry juice.

With regard to the aldehydes, the course remains comparable to that obtained previously, that is to say a better retention of these compounds in glycerol and yields lower than the control with oil. Benzaldehyde is retained in the separator only by oil.

The ketones show an improvement, but this is less significant than that obtained starting from 800 g of raspberries. The better recovery of the α- and β-ionones in the control largely explains the fall in the gains observed.

On the other hand, in the case of the alcohols the improvement is more significant starting from 2 kg of raspberries than with 800 g and this result holds essentially for an enrichment of the extracts in geraniol, linalol and 4-terpinenol, especially in the presence of glycerol.

In the case of the lactones, the recovery rates increase enormously in the presence of oil or of glycerol and this is due to δ-decalactone contents which have doubled in the presence of trapping media.

TABLE 14

Extraction of raspberry juice with supercritical
$CO_2$ (P = 150 bar and T = 36° C.).
Neutral volatile constituents identified

| COMPOUNDS | Control X (µg) | Control VC (%) | Extractions with 200 ml of glycerol X (µg) | Extractions with 200 ml of glycerol VC (%) | Extractions with 200 ml of oil X (µg) | Extractions with 200 ml of oil VC (%) |
|---|---|---|---|---|---|---|
| ESTERS | | | | | | |
| Menthyl acetate | n.d. | | n.d. | | n.d. | |
| ALDEHYDES | | | | | | |
| Hexanal | 1.9 | 63 | 2.8 | 9 | 2.2 | 65 |
| Heptanal | n.d. | | n.d. | | n.d. | |
| Nonanal | 8 | 15 | 12 | 2 | 5 | 18 |
| Nona-2,4-dienal | n.d. | n.d. | | n.d. | | |
| KETONES | | | | | | |
| α-Ionone | 1.5 | 23 | 0.8 | 30 | 2.1 | 44 |
| β-Ionone | 1.3 | 65 | 6.5 | 52 | 2.1 | 10 |
| Frambinone | 35.1 | 43 | 64.4 | 20 | 40 | 48 |
| Gingerone | 8.9 | 42 | 25.2 | 5 | 11 | 10 |
| ALCOHOLS | | | | | | |
| 3-Methylbut-2-en-1-ol | n.d. | | n.d. | | n.d. | |
| cis-Hex-3-en-1-ol | 2.5 | 33 | 9.7 | 16 | 8.9 | 19 |
| Hexanol | — | — | — | — | 1.5 | 40 |
| Benzyl alcohol | 0.3 | 15 | 6.1 | 21 | 4.5 | 19 |
| 2-Phenylethanol | 0.7 | 48 | 3.9 | 25 | 3 | 27 |
| Geraniol | 0.5 | 40 | 1.3 | 7 | 9.8 | 35 |
| LACTONES | | | | | | |
| γ-Butyrolactone | 0.7 | 34 | 6.5 | 27 | 1.5 | 20 |
| γ-Hexalactone | 17.7 | 35 | 59 | 26 | 39.3 | 21 |
| δ-Octalactone | n.d. | | n.d. | | n.d. | |

TABLE 14-continued

Extraction of raspberry juice with supercritical $CO_2$ (P = 150 bar and T = 36° C.).
Neutral volatile constituents identified

| COMPOUNDS | Control | | Extractions with 200 ml of glycerol | | Extractions with 200 ml of oil | |
|---|---|---|---|---|---|---|
| | X (μg) | VC (%) | X (μg) | VC (%) | X (μg) | VC (%) |
| δ-Decalactone | 0.6 | 20 | 12.5 | 35 | 6.6 | 14 |

X = mean of the quantities obtained
VC = variation coefficient
n.d. = compound not determined In the methylene chloride fraction, the frambinone content of the extracts clearly increases in the presence of trapping media, particularly with glycerol. Benzyl alcohol and 2-phenylethanol are also better recovered with glycerol or oil in the separator.

Table 12 shows a development of the gains. When the charge of raspberry juice increases, a more significant improvement is observed for the polar compounds (lactones and alcohols) and a perceptible drop in the gains obtained is observed for the ketones in the presence of glycerol and of oil.

In the Presence of β-cyclodextrins (β-CDs)

In accordance with the experimental protocol, the β-CDs in which the volatile compounds of raspberries are incorporated were extracted first with Forane 11 and then with methylene chloride. The extraction with Forane 11 gave only quantitatively middling results. The two extracts were then combined. This regrouping enables the number of analyses to be reduced and the precision of the determination of the peaks by gas phase chromatography to be improved.

The results obtained are shown in Table 15.

TABLE 15

Extraction of raspberry juice with supercritical $CO_2$ (P = 150 bar and T = 36° C.) in in the presence of β-cyclodextrins.
Neutral volatile constituents identified

| COMPOUNDS | Control | | Extraction with 10 g of β-CD | |
|---|---|---|---|---|
| | X (μg) | VC (%) | X (μg) | VC (%) |
| HYDROCARBONS | | | | |
| 1,3-dimethylbenzene | — | | 2.6 | 10 |
| α-Pinene | 30.5 | 64 | 80 | 14 |
| Camphene | 39.4 | 94 | 96 | 18 |
| p-Cymene | 8.4 | 53 | 15 | |
| Limonene | — | | 2.9 | 30 |
| γ-Terpinene | 11.6 | 46 | 31 | 19 |
| Caryophyllene* | 30.7 | 37 | 40 | 20 |
| ESTERS | | | | |
| Ethyl acetate | n.d. | | n.d. | |
| Isopentenyl acetate | 37.8 | 47 | 38 | 25 |
| Ethyl hexanoate | 3.3 | | | |
| cis-Hex-3-en-1-yl acetate | 32 | 29 | 47 | 17 |
| Hexyl acetate | | | 13 | 22 |
| Ethyl 5-hydroxy-octanoate | 16.7 | 38 | 22 | 11 |
| | 2.5 | 41 | 2 | 0 |
| Menthyl acetate* | 46.4 | | | |
| Ethyl 5-hydroxy-decanoate | 9.8 | 31 | 50 | 14 |
| | | 33 | 9.5 | 31 |
| ALDEHYDES | | | | |
| Pentanal | n.d. | | n.d. | |
| Hexanal | 5.16 | 44 | 38 | 24 |
| trans-Hex-2-enal | 19 | 25 | 2 | 0 |
| Heptanal | n.d. | | n.d. | |
| Benzaldehyde | — | | 0.8 | 38 |
| Octanal | 6.8 | 45 | 13 | 24 |
| Nonanal | 18.3 | 22 | 6.5 | 9 |
| Decanal | n.d. | | n.d. | |
| Geranial* | 3.4 | 35 | 4.4 | 0 |

TABLE 15-continued

Extraction of raspberry juice with supercritical $CO_2$ (P = 150 bar and T = 36° C.) in in the presence of β-cyclodextrins.
Neutral volatile constituents identified

| COMPOUNDS | Control | | Extraction with 10 g of β-CD | |
|---|---|---|---|---|
| | X (μg) | VC (%) | X (μg) | VC (%) |
| KETONES | | | | |
| 2-Heptanone | 12.8 | 29 | 18 | 16 |
| Cyclohexanone | 3.5 | 35 | — | |
| 6-Methylhept-5-en-2-one | 2.8 | 28 | — | |
| α-Ionone* | 66.4 | 35 | 84 | 13 |
| β-Ionone* | 88 | 42 | 106 | 27 |
| Frambinone | 22 | 19 | 3.5 | 38 |
| Gingerone | 30 | 12 | 4.3 | 6 |
| ALCOHOLS | | | | |
| Pentanol | n.d. | | n.d. | |
| 3-Methylbutanol | n.d. | | n.d. | |
| 3-Methylbut-2-en-1-ol | n.d. | | n.d. | |
| cis-Hex-3-en-1-ol | 103.3 | 49 | 19 | 35 |
| Hexanol | 64.7 | 30 | 26.5 | 24 |
| 2-Heptanol | 25 | 45 | 8.4 | 26 |
| Benzyl alcohol | n.d. | | n.d. | |
| Octanol | 13.7 | 18 | 2 | 30 |
| Linalol | 136.9 | 26 | 115 | 9 |
| 2-Phenylethanol | — | — | 1 | 30 |
| Menthenol | 12.3 | 17 | 5.2 | 10 |
| 4-Terpinenol* | 27 | 17 | 25.4 | 5 |
| 8-p-Cymenol* | 7.4 | 53 | 1.7 | 30 |
| α-Terpineol* | 17.4 | 42 | 9.8 | 20 |
| Myrtenol* | — | — | 1.6 | 8 |
| Nerol* | 27.9 | 47 | 19 | 20 |
| Geraniol* | 723.6 | 17 | 560 | 7 |
| Dihydro-β-ionol | 9.7 | 28 | 5.6 | 6 |
| LACTONES | | | | |
| γ-Butyrolactone | 34.1 | 55 | — | |
| γ-Hexalactone | 67.1 | 25 | 3.9 | 40 |
| γ-Octalactone | 1.6 | 46 | — | |
| δ-Octalactone | 265.6 | 38 | 90 | 24 |
| δ-Decalactone | 302.9 | 39 | 185 | 21 |
| Dihydroactinidiolide | 4.2 | 60 | 4.5 | 32 |
| ETHERS | | | | |
| Cineole | 48.7 | 45 | 53 | 22 |
| Theaspirane | 1.9 | 72 | 2.9 | 5 |

X = mean of the quantities obtained
VC = variation coefficient
n.d. = compound not determined Analysis of the chromatograms enabled two groups of compounds to be detected: a first group for which the quantities recovered in the β-CDs are higher than those for these same compounds with the control, and a second group of compounds for which the quantities recovered in the β-CDs are lower than those of the control. In this second group extraction coefficients (between the solvent and the β-CDs) were measured for certain compounds (which, moreover, are not found in the supernatant liquor).

The corrected quantities obtained for these compounds are closer to reality and are indicated by asterisks in Table 15.

With regard to the chemical category of hydrocarbons, the results obtained are convincing. For the monoterpenes, the quantities are multiplied by 2, and with respect to caryophyllene, its increase is also significant.

The presence of limonene is also found. The β-CDs are at least partly able to retain this compound, which, by reason of its agreeable lemon odour and its very low perception threshold (1 ppb) is able to modify the fragrance quality of the extract.

The presence of such quantities of hydrocarbons in the control may be explained by a difference in the sunshine and rainfall between the years of harvesting.

m-Xylene is also present in the extract recovered with the β-cyclodextrins. In the chemical category of esters, the supply of β-CDs would appear to be beneficial for most of the compounds, although the gains observed do not reach those obtained in the case of the hydrocarbons. The two esters for which the supply of β-CDs has an adverse effect are ethyl 5-hydroxyoctanoate and ethyl 5-hydroxydecanoate, both having a hydroxyl group in their structure. The β-CDs would not appear suitable for the aldehydes. Most of the compounds have lower yields than those of the control. The aldehydes which form an exception to the above are octanal, benzaldehyde and geranial. Geranial has a very low perception threshold of $3 \times 10^{-6}$ ppm and participates the raspberry aroma. As for benzaldehyde, most of the compounds which, like it, possess a benzene ring may easily form complexes with the β-CDs (2-phenylethanol, m-xylene, etc . . . ). The variety "Rose de Côte d'Or" is rich in α- and β-ionones, compounds which participate in the raspberry aroma. Both α-ionone and β-ionone are retained significantly by β-CDs. On the contrary, frambinone and gingerone are only moderately retained by β-CDs; the essential part of these compounds is found in the aqueous/alcoholic supernatant liquor. The major compounds in terms of quantity in the raspberry aroma are geraniol and δ-decalactone, which belong to chemical categories (the alcohols and the lactones respectively) less strongly retained by the β-CDs. Because of this selectivity, the β-CD extract clearly appears to have a more typical raspberry odour than the control. This observation may be correlated with chromatographic data which show that the β-CDs assist the recovery of several volatile compounds, some of which are present in trace amounts in the fruit. Some of these compounds, having sufficiently low perception thresholds, are able to participate in the raspberry aroma. Moreover, the β-CD extract maintains a better equilibrium between the compounds. Thus, the proportions of terpene alcohols and of δ-decalactone are reduced and induce more limited distortion of the fruit flavour.

Moreover, results corroborating those reported above have been obtained with material no. 1.

We claim:

1. Process for the extraction of volatile compounds from a starting material with supercritical carbon dioxide, according to which a percolation of supercritical gas through the said starting material is conducted, the carbon dioxide loading with extractable compounds, then, when the percolation pressure reaches a predetermined value, the percolation medium is let down, feeding the latter into a separation zone in which the volatile compounds are trapped in the solid carbon dioxide formed, the volatile compounds being recovered in aqueous solution after sublimation of $CO_2$, characterized in that the extraction is conducted, in the separation zone, in the presence of an amount of trapping medium which is sufficient to retain the said volatile compounds.

2. Process according to claim 1, wherein in the trapping medium has very low solubility in liquid or supercritical $CO_2$ and is capable of dissolving or complexing the volatile compounds of the starting material.

3. Process according to claim 2, wherein the trapping medium is capable of dissolving the volatile compounds.

4. Process according to claim 2, wherein the trapping medium is suitable for complexing the volatile compounds of the starting material.

5. Process according to claim 1 wherein the trapping medium is a medium which can be used directly in the agro-foodstuffs field.

6. Process according to claim 1 wherein the trapping medium is glycerol or an edible oil.

7. Process according to claim 6, characterized in that the trapping medium is introduced in an amount of from 1 to 10% by weight relative to that of the starting material.

8. Process according to claim 1 wherein the trapping medium is a cyclodextrin, especially β-cyclodextrin.

9. Process according to claim 8, wherein the trapping medium is introduced in an amount of from 0.05 to 0.5% by weight relative to that of the starting material.

10. Process according to claim 1 wherein the starting material contains volatile products and has a lipid content which is not excessively high.

11. Process according to claim 10, wherein the starting material is from fruit a derived product or non-fatty vegetable material containing essential oil.

12. Trapping medium having retained the volatile compounds, which is substantially similar to that obtained by the process according to claim 1.

13. A volatile compound obtained after separation of the trapping medium resulting from the process as defined in claim 1.

14. A method of imparting aroma to a foodstuff or a perfume with an aromatic substance, wherein the aromatic substance is a volatile compound of claim 13.

* * * * *